May 6, 1969 D. PETZOLD 3,443,071
COUNTER
Filed May 18, 1965 Sheet 1 of 25

Inventor:
Dieter Petzold
By: Spencer & Kaye
Attorneys

May 6, 1969 D. PETZOLD 3,443,071
COUNTER
Filed May 18, 1965 Sheet 4 of 25

Inventor:
Dieter Petzold
By: Spencer & Kaye
Attorneys

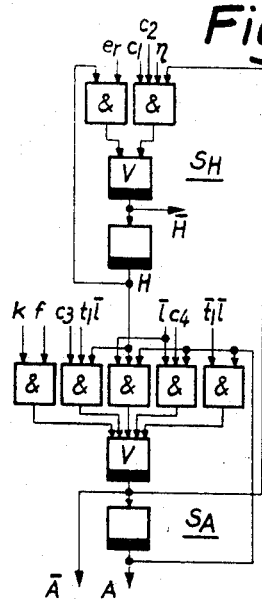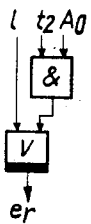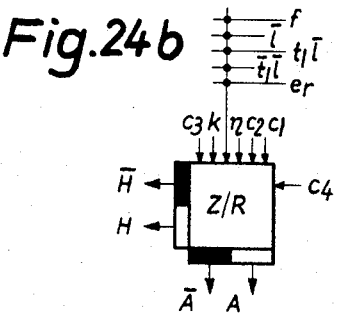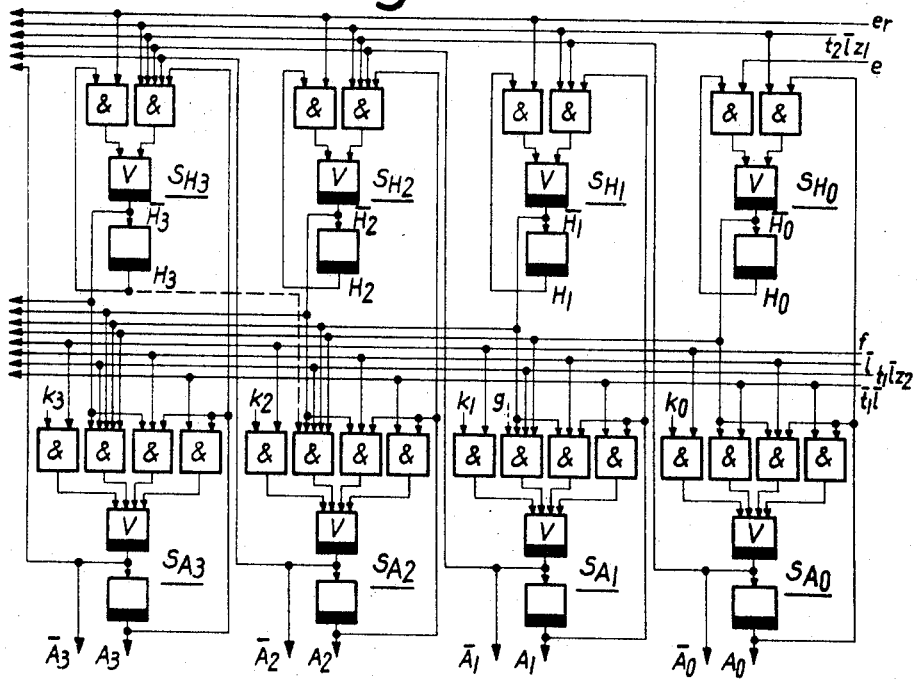

Inventor:
Dieter Petzold
By: Spencer & Kaye
Attorneys

Inventor:
Dieter Petzold

By: Spencer & Kay
Attorneys

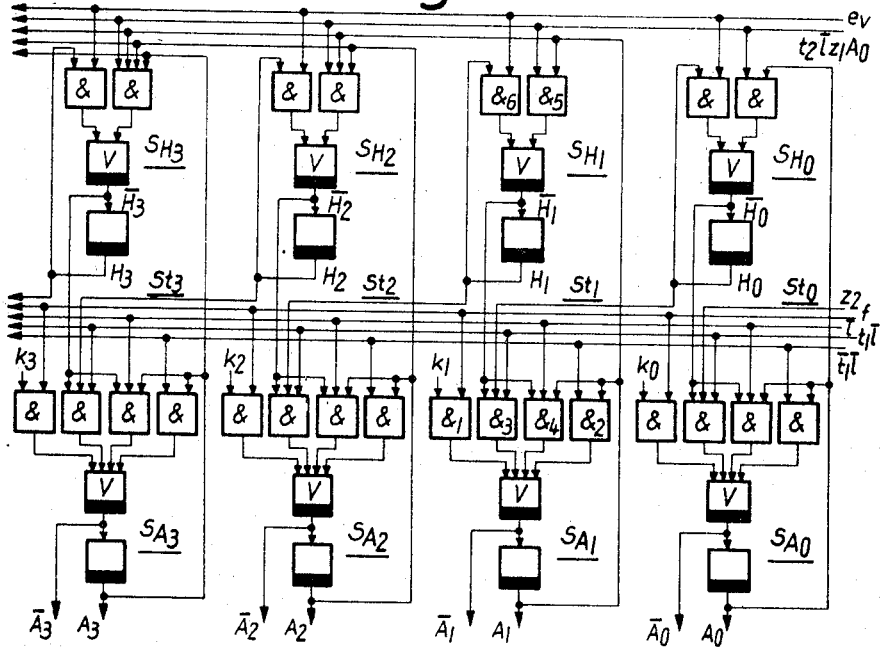
Fig. 33
Fig. 35a
Fig. 35b
Fig. 39a
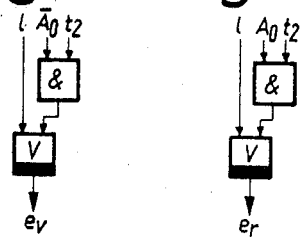
Fig. 38
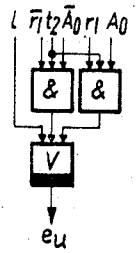
Fig. 39b
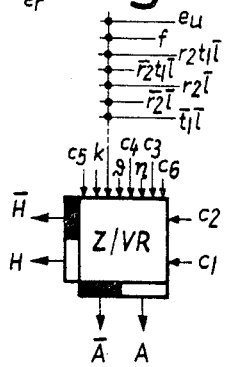
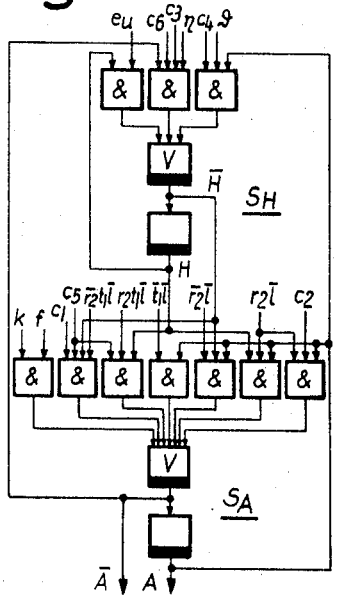

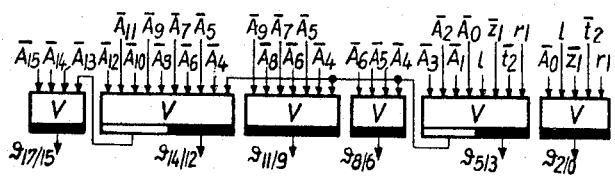
Fig.40b
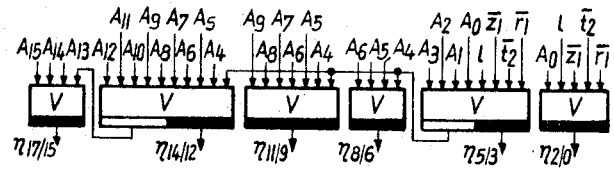
Fig.40c
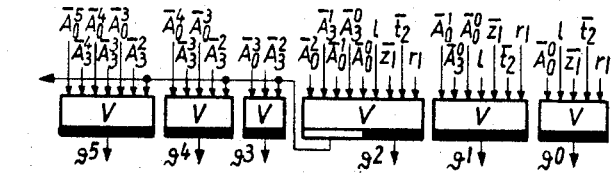
Fig.43b
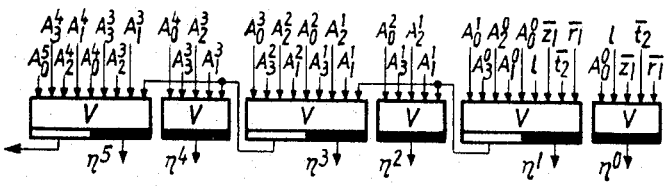
Fig.43c
Fig.45
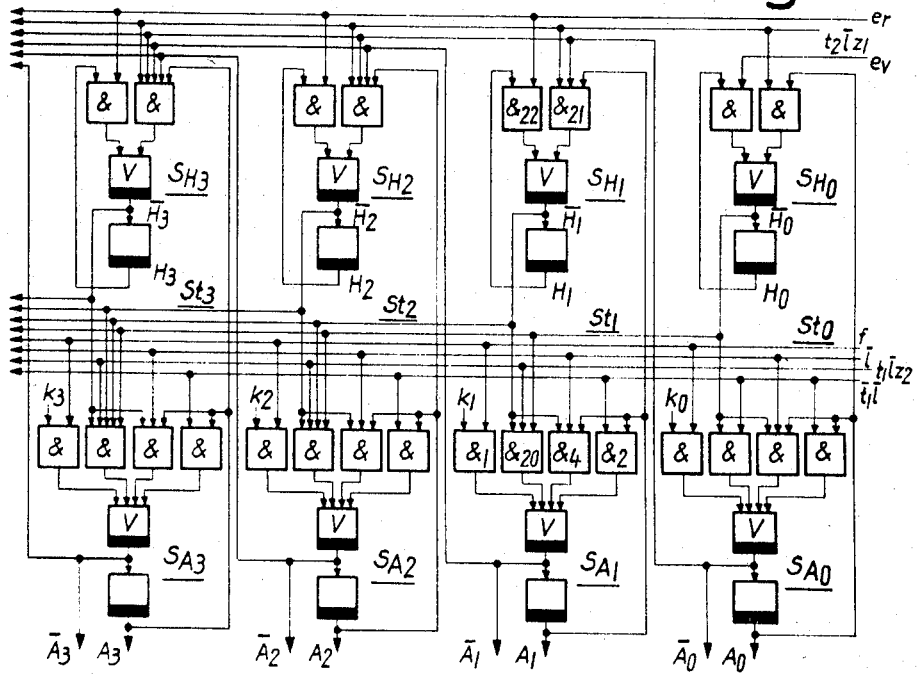

Inventor:
Dieter Petzold
By: Spencer & Kaye
Attorneys

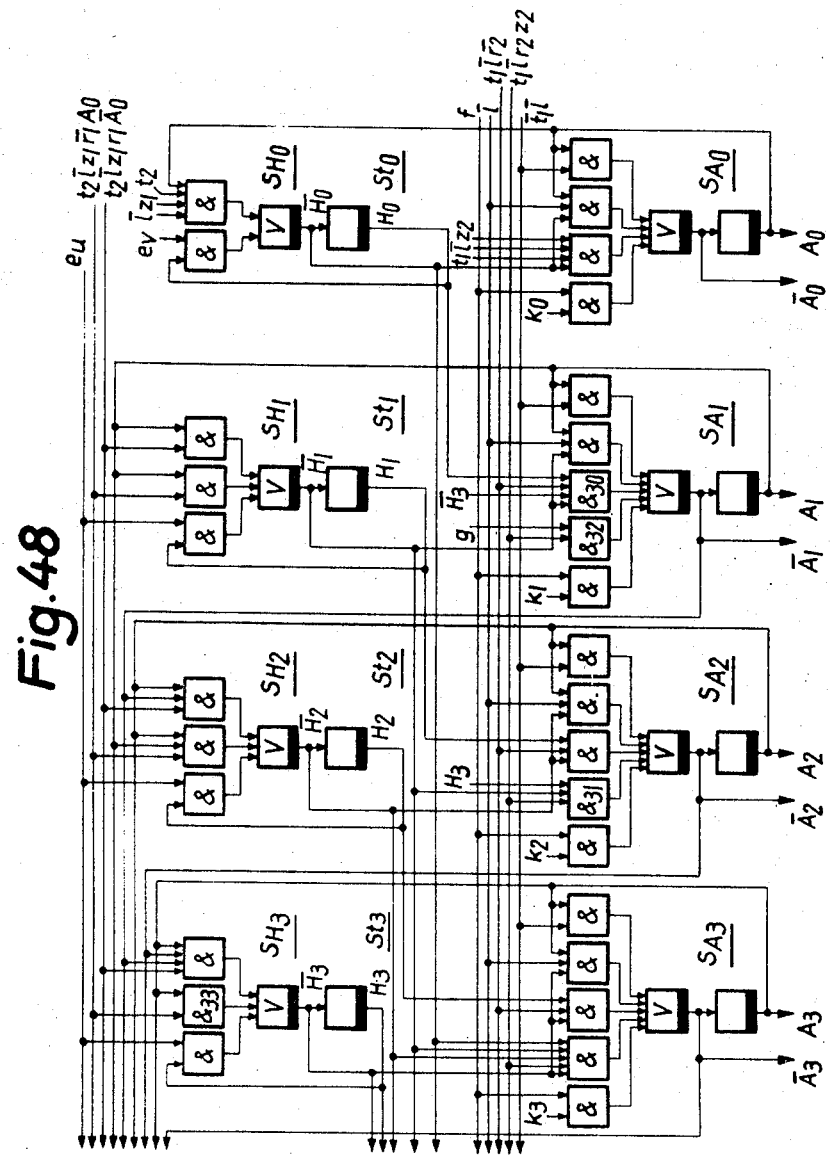

United States Patent Office 3,443,071
Patented May 6, 1969

3,443,071
COUNTER
Dieter Petzold, Berlin, Germany, assignor to Licentia Patent-Verwaltungs-G.m.b.H., Frankfurt am Main, Germany
Filed May 18, 1965, Ser. No. 456,735
Claims priority, application Germany, May 19, 1964, L 47,830; Apr. 26, 1965, L 50,569, L 50,570
Int. Cl. G06g 7/14; H03k 21/32
U.S. Cl. 235—92
36 Claims

ABSTRACT OF THE DISCLOSURE

A multiple stage counter for forward and reverse binary and decimal counting and capable of being preset to a selected starting number. Each stage has a main and an auxiliary storage unit, there being means for applying counting signals to the main storage unit and means for applying auxiliary counting signals to the auxiliary storage unit. The auxiliary counting signals change their conditions at different times than the counting signals. The main and auxiliary storage units of the stages are connected with each other in such a manner that the changes in the counter stages caused by the counting and auxiliary counting signals take place, respectively, within the storage time for one storage unit.

TABLE OF CONTENTS

| Section | Column |
|---|---|
| Introduction | 1 |
| Objects of Invention | 2 |
| Brief Description of Invention | 2 |
| Brief Description of Drawings | 3 |
| Detailed Description of Drawings | 5 |
| FIGURES 1, 2a and 2b | 5 |
| FIGURE 3 | 8 |
| FIGURE 18 | 8 |
| FIGURE 4 | 9 |
| FIGURES 5a and 5b | 10,11 |
| FIGURE 6 | 11 |
| FIGURE 7 | 11 |
| FIGURES 8 and 9 | 12 |
| FIGURE 19 | 12 |
| FIGURE 20 | 12,13 |
| FIGURE 10 | 13 |
| FIGURE 11 | 13 |
| FIGURE 12 | 14 |
| FIGURES 13, 14, 15 and 21 | 14 |
| FIGURE 16 | 15 |
| FIGURE 17 | 15 |
| FIGURE 22 | 15,16 |
| FIGURE 23 | 16 |
| FIGURE 24a and 24b | 16 |
| FIGURE 25a | 16 |
| FIGURE 25b | 17 |
| FIGURE 26 | 17 |
| FIGURE 27 | 17 |
| FIGURE 28 | 17 |
| FIGURE 29 | 17 |
| FIGURE 30 | 18 |
| FIGURE 31 | 18 |
| FIGURE 32 | 18 |
| FIGURE 33 | 18 |
| FIGURES 34, 35a, and 35b | 18 |
| FIGURE 36 | 18 |
| FIGURES 37a and 37b | 19 |
| FIGURE 38 | 19 |
| FIGURES 39a and 39b | 20 |
| FIGURES 40a, 40b and 40c | 20 |
| FIGURE 41 | 20,21 |
| FIGURE 42 | 21 |
| FIGURES 43a, 43b, 43c and 44 | 21 |
| FIGURE 45 | 21 |
| FIGURE 46 | 21,22 |
| FIGURE 47 | 22 |
| FIGURE 48 | 22,23 |
| FIGURE 49 | 23 |

The present invention relates generally to electronic counters and, more particularly, to static counters which can count in both the forward and the reverse direction.

INTRODUCTION

Static counters have already been proposed which, for each counting stage, comprise a main and an auxiliary storage unit, and whose counting stages are controlled in parallel by means of counting signals and auxiliary counting signals. The maximum counting frequency of these parallel-controlled counters diminishes with the number of counting stages.

Furthermore, static series-controlled counters have been proposed which likewise, for each counting stage, comprise a main and an auxiliary storage unit. In these counters, only the input counting stage is controlled by the counting and auxiliary counting signals, whereas all of the subsequent counting stages are controlled only by the respectively, immediately preceding counting stage. The maximum counting frequency of such a series-controlled counter is higher than the frequency of the above-mentioned, parallel-controlled counter. However, this counting frequency cannot be utilized for many purposes, for example a preliminary selection. Before a counter content can be put out or evaluated, all switching processes triggered by counting signals and auxiliary counting signals must have finished running through the switching chain of the counter.

OBJECTS OF INVENTION

With this in mind, it is an object of the present invention to provide a static counter whose maximum counting frequency does not decrease with the number of counting stages, and in which the counting result can be derived during the counting operation, even when counting at maximum frequency.

Another object is to provide a counter which can be constructed to be presettable and can furthermore be selectively used as a binary or decimal counter, in which, when switching over to decimal counting operation, the counting rate of the counter does not diminish.

A further object of the invention is to provide a counter which, upon the appearance of an inactivating or clearing signal $1=L$ at its affirmative (YES) outputs, emits a zero and, after being preset, indicates the preset digit, a reverse counting operation taking place directly at the YES counter outputs. (In this specification, "L" represents binary one, and "$l$," depending upon context, is either the lowercase 12th letter of the alphabet or decimal one.)

A still further object of the invention is to provide a counter wherein the forward as well as the reverse counting operation from the preset digit or zero takes place at the YES counter outputs, and wherein the counting direction can be changed during the counting operation.

BRIEF DESCRIPTION OF INVENTION

These objects and others ancillary thereto are accomplished in accordance with preferred embodiments of the invention, which relates to a static counter for forward and reverse counting operation, with the selective presetting of a starting digit, for binary and decimal counting. The counter is similar to my copending application Ser. No. 327,585, filed Nov. 29, 1963. In accordance with the invention, the counter comprises, for each counter stage, a main storage unit and an auxiliary storage unit. The main storage units are controlled by counting signals and the auxiliary storage units are controlled by auxiliary counting signals. These signals do not simultaneously change their condition. The main and auxiliary storage units are connected with each other in such a manner that the switching operations trigged by the counting signals and auxiliary counting signals in the counting stages take place respectively within the storage time or period of a storage unit.

In accordance with a further embodiment, the main storage units of the counting stages are controlled only by output signals of the auxiliary storage units, and the auxiliary storage units are controlled only by output signals of the main storage units. Suitably, in each counting stage, each auxiliary storage unit is controlled by the main storage unit to which it is assigned and by main storage units of preceding counting stages. Also, each main storage unit is controlled by the auxiliary storage unit to which it is assigned and by auxiliary storage units of preceding counting stages.

In accordance with a further embodiment, for decimal counting, in each decade of four counting stages, a signal from the counting stage having the highest order of the decade is fed back to the counting stage having the second lowest order.

Corresponding to a further embodiment, for the purpose of limiting the number of inputs in the counting stages, signals which previously had controlled the counting stages are combined in separate logical circuits and the output of these circuits is connected to the counting stages. Suitably, the auxiliarly storage units [main storage units] are connected with one another, and a signal of a lower counting stage is applied to these storage units.

In order to accomplish that the result of a reverse counting appears at the YES outputs [A] of the main storage units, the counting stages, according to the invention, are connected in such a manner that the auxiliary storage unit of each counting stage is controlled by the negated output signals $[\bar{A}]$ of the main storage units of all counting stages of lower order, and each main storage unit is controlled by the negated output signal $[\bar{H}]$ of the counting stage having the next-lower order.

According to a further embodiment, each main storage unit is controlled by the negated output signals $[\bar{H}]$ of the auxiliary storage units, of all counting stages of lower order.

According to a further development, for the purpose of selective forward/reverse counting operation at the YES outputs of the main storage units, a switching over or reversing signal is effective at all previous main and auxiliary storage units of the counting stages. This signal serves for the forward counting operation, and the main auxiliary storage units are enlarged by additional input stages at which the reverse order switching-over signal [r] for the reverse counting is effective, and each enlarged main storage unit is controlled by the output signals of the auxiliary storage units of the counting stage having the next lower order and each enlarged auxiliary storage unit is controlled by the output signals of all counting stages of lower orders.

BRIEF DESCRIPTION OF DRAWINGS

Additional objects and advantages of the present invention will become apparent upon consideration of the following description when taken in conjunction with the accompanying drawings in which:

FIGURE 5b shows a symbol for the counting component of FIGURE 5a.

FIGURE 23 is a circuit diagram of a device for forming the signal $e_r$.

FIGURE 24a is a circuit diagram of a counter component for reverse counters.

FIGURE 24b is a block diagram showing the symbol for the component of FIGURE 24a.

FIGURE 30 is a circuit diagram of a reverse counter in which the auxiliary signal is 0 at the beginning of the A signal and is L at the end of this signal.

FIGURE 33 is a circuit diagram of a binary counter where forward counting takes place at the outputs A.

FIGURE 35a is a circuit diagram of a device for forming signal $e_v$.

FIGURE 35b is a circuit diagram of a device for forming signal $e_r$.

FIGURE 38 is a circuit diagram of a device for forming signal $e_u$.

FIGURE 39a is a circuit diagram for a counter component of the counter of FIGURE 36.

FIGURE 39b is a block diagram showing a symbol for the component of FIGURE 39a.

FIGURE 40b is a block diagram of a device for forming signals $\vartheta$.

FIGURE 40c is a block diagram of a device for forming signals $\eta$.

FIGURE 43b is a block diagram of a device for forming signals $\vartheta$.

FIGURE 43c is a block diagram of a device for forming signals $\eta$.

FIGURE 45 is a circuit diagram of a reverse counter similar to that of FIGURE 34 but having auxiliary signals having timing similar to that of FIGURE 33.

FIGURE 48 is a circuit diagram of a decade forward/reverse counter similar to that of FIGURE 46.

DETAILED DESCRIPTION OF DRAWINGS

Figure 1:
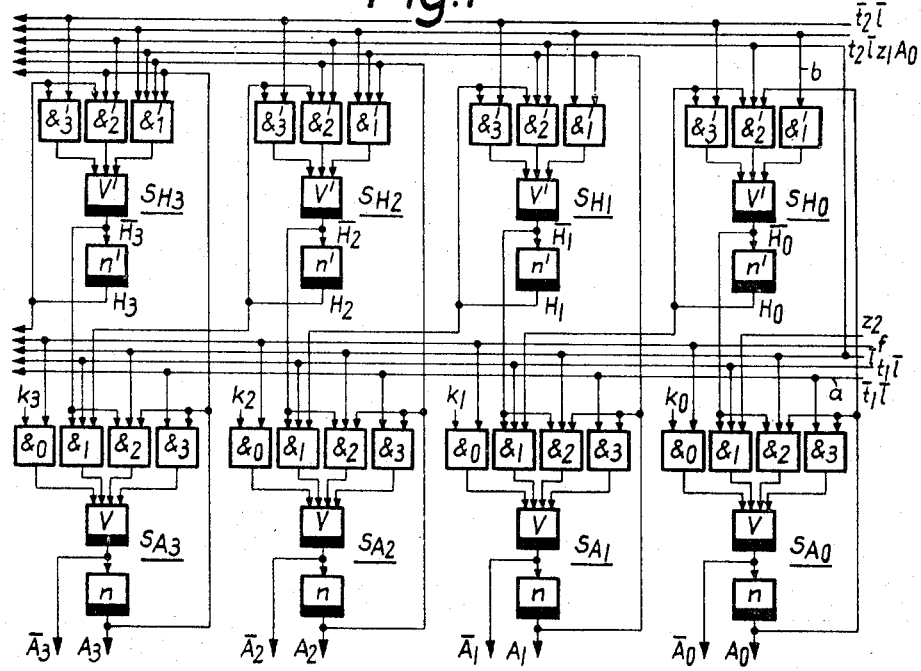
FIGURE 1 is a circuit diagram showing four counting stages of a binary counter constructed in accordance with the present invention.
Figure 2A:
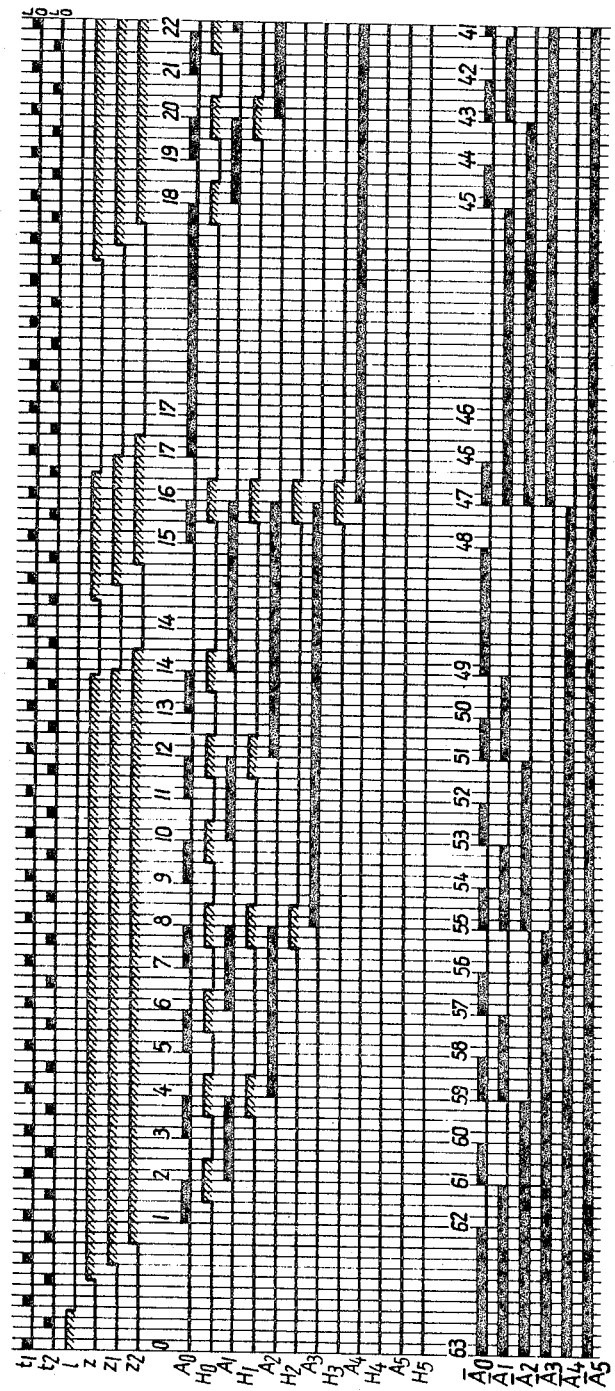
FIGURE 2a is a time plot of the signals appearing in the counter of FIGURE 1.

With more particular reference to the drawings, FIGURE 1 shows four counting stages of a binary counter. These stages include one main and one auxiliary storage unit each. In FIGURE 2a, a corresponding signal diagram is shown and, for the sake of simplicity, the signals are drawn as rectangles. The switching times of the structural components producing the signals are not taken into consideration herein. The main storage units are designated $S_{A0}$ to $S_{A3}$, and the auxiliary storage units $S_{H0}$ to $S_{H3}$. The digit index refers to the order of the counting stage, for example, index 3 refers to the order $2^3$.

Each main storage unit includes input AND-stages &, which have connected thereafter on OR/NOT-stage $v$, the latter stage controlling a NOT-stage $n$. The setting stages at the main storage units are designated $\&_1$ and the holding stages $\&_2$, $\&_3$. Furthermore, a further input stage $\&_0$ is provided for the purpose of presetting. A holding stage has the characteristic feature that the output of the store pertaining to this stage is fed back to such stage. The other input stages of this storage unit, namely, the stages to which the output of this storage unit is not fed back, are setting stages.

The auxiliary storage units $S_H$ include three input AND-stages $\&'$ controlling an OR/NOT-stage $v'$. A NOT-stage $n'$ is connected after the OR/NOT-stage $v'$. The setting stage in these auxiliary storage units is designated $\&_1'$, while the holding stages are designated $\&_2'$, $\&_3'$.

As can be seen, the number of inputs at the auxiliary storage units H increases for the counting stages having a higher order digit. The AND-stage of the auxiliary storage unit $S_{H0}$ could also be omitted and its input line could be connected directly to the OR/NOT-stage. A deviation was made from the manner of illustration which is ordinarily used, in order to point out that, when the storage unit is realized by means of diodes and transistors, the line is connected to a diode, as is usually the case with AND-stages. Because of this fact, the input $b$ behaves, as far as load is concerned, in the same manner as the other inputs of the further AND-stages.

The counter content is put out in parallel by the A-outputs of the main storage units. The output signals H and $\overline{H}$ of the auxiliary storage units are utilized for determining the instants at which the main storage units are to be set and cleared. The storage units are connected with one another in such a manner that the output signals of the main storage units are effective only upon auxiliary storage units and the output signals of the auxiliary storage units are effective only upon main storage units.

Figure 2B:
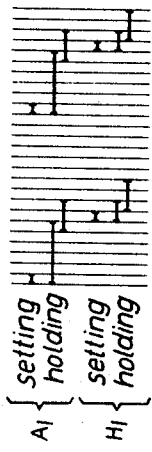
FIGURE 2b is a time plot of the partial signals forming signals $A_1$ and $H_1$.

The main and auxiliary storage units are constructed such that the partial signals emitted from the input AND-stages [setting and holding stages] which result in the output signals A and H of the storage units, overlap one another. In FIGURE 2b, for example, the composition of signals $A_1$ and $H_1$ from the partial signals is illustrated. That is, signals $A_1$ and $H_1$ result respectively from the output signals of a setting stage and two holding stages. As can be seen, A and H signals which are free from discontinuities result from the overlapping partial signals.

The signals to be counted are designated $t_1$ and are applied in parallel to the main storage units. In addition to the counting signals $t_1$, auxiliary counting signals $t_2$ are required for controlling the counter. These auxiliary counting signals must not change their condition at the same time as the $t_1$ signals. For purposes of the present embodiment, for example, it is assumed that the $t_2$ signals always occur in the gap between two $t_1$ signals. The $t_2$ signals are connected in parallel to the auxiliary storage units.

The $t_1$ and $t_2$ signals may have any desired shape. It is only necessary that the $t$ signals have a sufficient amplitude and duration dependent upon the structural components. No requirements are imposed as to the steepness of the pulse or signal curve flank. Erroneous countings are not caused when a $t_1$ signal ($t_2$ signal) should appear and disappear several times between two $t_2$ signals ($t_1$ signals), as may occur, for example, during the generation of these signals by means of mechanical contacts on account of contact chattering or on account of oscillations in another signal generator.

Before a counting operation is begun, all storage units of the counter are cleared by an erase or clearing signal $1=L$. During counting, $l=0$.

If desired, the counter can be preset to any desired starting digit or number so that instead of from zero, the counter counts from the starting digit upon the first $t_1$ signal occurring. The presetting can be done by presetting signals $k$ which are directly effective upon the OR/NOT-stage of the main storage units in the form of input signals. Suitably, the $k$ signals are connected, in the counter illustrated, together with a clear-for-presetting or presetting release signal $f$, to the input stage $\&_0$, and only the output of this $\&_0$ stage is connected to the OR/NOT-state, so that the $k$ signals can influence the main storage units only when $f=L$.

In order to block the counter, or in order to interrupt the counting operation, there is provided a clear-for-counting of counting release signal $z_2$. While $z_2=L$, the $t_1$ signals are counted. However, if $z_2=0$, they are not counted—the counter level or content which has been attained is maintained in the last-mentioned case.

Circuit arrangements for generating the signals $z_2$ and $f$ are set forth further below.

Suitably, for the purpose of decreasing the number of inputs in connection with the storage units of the counting stages, signals which together are effective upon several input stages are combined in separate circuits. For example, the signals $\bar{t}_1$, $\bar{I}$ which are indicated at input $a$, can be connected to an AND-stage with two inputs whose output is connected to input $a$.

In the counters mentioned in the introduction to the specification, inter alia, the output signals of the auxiliary storage units of the preceding counting stages are connected to an auxiliary storage unit, and/or output signals of the main storage units of the preceding counting stages are connected to a main storage unit. By means of such an interconnection, the setting and/or holding of the storage units is delayed from counting stage to counting stage.

If, for example, all auxiliary storage units are to be set at a certain instant by means of a signal (FIGURE 2, during counting condition 15), then—if the setting stage of an auxiliary storage unit is controlled respectively by an output signal of the auxiliary storage unit of the preceding counting stage—the setting of these storage units from counting stage to counting stage occurs with a delay, the time of such delay being given by the structural components and the values of the storage units. Correspondingly, the cessation of the H signals (FIGURE 2, during counter condition 16) takes place with a delay if output signals from auxiliary storage units of the preceding counting stages are connected to a holding stage of the auxiliary storage units. An analogous consideration is true for the main storage units.

Because of the delay in setting and/or holding of the H and A signals, which delay increases from counting stage to counting stage, the maximum counting frequency of the parallel-controlled counters decreases with the number of counting stages employed, as a counting signal (auxiliary counting signal) may be passed on to the counter only at that time when all switching operations triggered by the preceding auxiliary counting signal (counting signal) have been carried out. In the proposed series-controlled counters, a counting signal (auxiliary counting signal) can be applied to the input counting stage even before all switching operations triggered by the preceding auxiliary counting signal (counting signal) have passed through the counting chain. However, if the counter content is to be evaluated during the counting operation—as is necessary for many control purposes—it is a necessity to wait, before putting out the counter content, for the setting of all counting stages, i.e., the utilizable cutoff frequency or limiting frequency is decreased by the above-mentioned delay time which increases with the number of counting stages.

The disadvantage of the decreases in the upper limit frequency with the number of counting stages is avoided in the counter according to the invention.

In the embodiment according to FIGURE 1, the main storage units $S_A$ are, in addition to being controlled by the output signals of the auxiliary storage units $S_H$, also controlled by the counting signal $t_1$, in parallel. The auxiliary storage units are, in addition to being controlled by the output signals of the main storage units, also controlled by the auxiliary counting signal $t_2$, in parallel.

The auxiliary storage units are assumed to have any desired condition. If now a counting signal $t_1$ appears, this is being processed simultaneously in all main storage units. After a time period determined by the storage time of a storage unit, the main storage units put out, at the A outputs, the new counting content or level. The $t_1$ signal need only have a duration which corresponds to this storage time. As the output signals of the main storage units assume the new condition during the $t_1$ signal, an auxiliary counting signal $t_2$ may occur immediately after a $t_1$ signal. The $t_2$ signal must likewise have a duration corresponding to the storage time of a storage unit. The $t_2$ signal is simultaneously processed in all auxiliary storage units so that the output signals H of the auxiliary storage units assume their new condition during the presence of the $t_2$ signal. Immediately after the $t_2$ signal, the subsequent $t_1$ counting signal may occur, and so forth. The chronological spacing of two signals $t_1$ to be counted thus needs to be only a little larger than twice the storage time of a storage unit. The maximum counting frequency only depends on this condition, but not upon the number of the counting stages for, as has been set forth above, the main storage units, with the occurrence of a $t_1$ signal, as well as the auxiliary storage units with the occurrence of a $t_2$ signal, assume their new conditions simultaneously in all counting stages of the counter. In the signal diagram, for reasons of clarity, the duration and the spacings of the $t_1$ and $t_2$ signals are chosen to be equal.

The counter according to FIGURE 1 has the following switching functions:

$A_0 = (t_1 \& \bar{l} \& z_2 \& \bar{H}_0) \vee (A_0 \& \bar{H}_0 \& \bar{l}) \vee (A_0 \& \bar{t}_1 \& \bar{l}) \vee (k_0 \& f)$
$A_1 = (t_1 \& \bar{l} \& H_0 \& \bar{H}_1) \vee (A_1 \& \bar{H}_1 \& \bar{l}) \vee (A_1 \& \bar{t}_1 \& \bar{l}) \vee (k_1 \& f)$
$A_2 = (t_1 \& \bar{l} \& H_1 \& \bar{H}_2) \vee (A_2 \& \bar{H}_2 \& \bar{l}) \vee (A_2 \& \bar{t}_1 \& \bar{l}) \vee (k_2 \& f)$
$A_3 = (t_1 \& \bar{l} \& H_2 \& \bar{H}_3) \vee (A_3 \& \bar{H}_3 \& \bar{l}) \vee (A_3 \& \bar{t}_1 \& \bar{l}) \vee (k_3 \& f)$
.
.
.

$H_0 = (t_2 \& \bar{l} \& z_1 \& A_0) \vee (H_0 \& \bar{t}_2 \& \bar{l}) \vee (H_0 \& A_0 \& \bar{l})$
$H_1 = (t_2 \& \bar{l} \& z_1 \& A_0 \& A_1) \vee (H_1 \& \bar{t}_2 \& \bar{l}) \vee (H_1 \& A_1 \& \bar{l})$
$H_2 = (t_2 \& \bar{l} \& z_1 \& A_0 \& A_1 \& A_2) \vee (H_2 \& \bar{t}_2 \& \bar{l}) \vee (H_2 \& A_2 \& \bar{l})$
$H_3 = (t_2 \& \bar{l} \& z_1 \& A_0 \& A_1 \& A_2 \& A_3) \vee (H_3 \& \bar{t}_2 \& \bar{l}) \vee (H_3 \& A_3 \& \bar{l})$
.
.
.

As can be seen, in one of the holding conditions of the switching functions for $H_n$, the signal $A_n$ appears. This signal can be replaced by the signal $A_0$ in all stages. The signals which are then effective together at all auxiliary storage units of the counting stages, which signals are designated $\bar{t}_2 \& \bar{l}$, as well as $A_0 \& \bar{l}$ can be separated from the rest and combined into one signal $e$. By this measure, the binary counter according to FIGURE 1 can be simplified.

Figure 3:
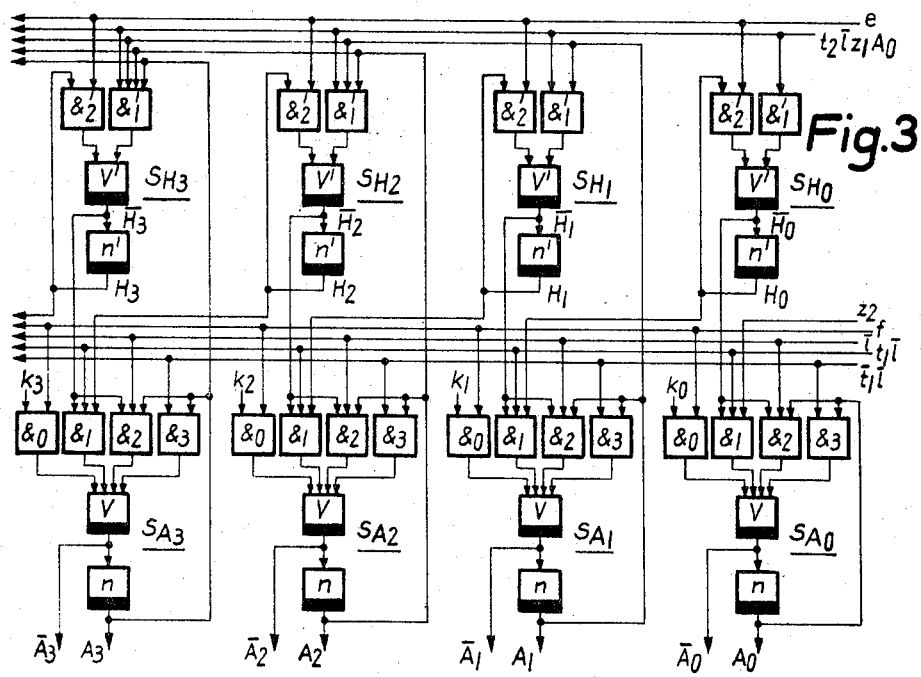
FIGURE 3 is a circuit diagram of a counter similar to that of FIGURE 1 but having simplified auxiliary storage units.

FIGURE 3 shows a corresponding embodiment wherein the construction of the main storage units $S_{A0}$ to $S_{A3}$ is the same as that of main storage units $S_{A0}$ to $S_{A3}$ of FIGURE 1. The auxiliary storage units $S_{H0}$ to $S_{H3}$ of the counter according to FIGURE 3 are simplified in comparison to those of the counter of FIGURE 1. The setting stages $\&_1'$ of the auxiliary storage units likewise are identical to the setting stages of the auxiliary storage units of the counter of FIGURE 1. Only the holding stages of the auxiliary storage units are varied. In place of two holding stages in the counter of FIGURE 1, only one holding stage is left per auxiliary storage unit. To this holding stage $\&_2'$ there is applied, on the one hand, the output signal H of the auxiliary storage unit assigned thereto and also the signal $e$ which is connected in parallel to all holding stages. The signal $e$ is formed in a separate logical circuit in accordance with one of the following switching functions:

$$(\bar{t}_2 \& \bar{l}) \vee (A_0 \& \bar{l}) = e$$

or $$(t_2 \& \bar{A}_0) \vee l = \bar{e}$$

Figure 18:
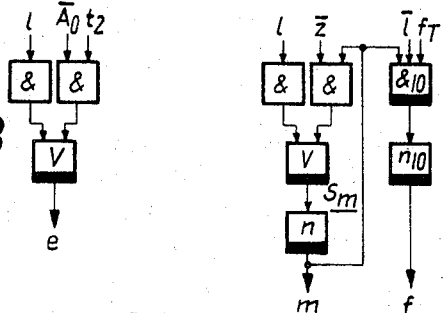
FIGURE 18 is a circuit diagram of a device for forming signal $e$.

FIGURE 18 shows one of the possible embodiments for the formation of signal $e$. The circuit comprises two input AND-stages & with an OR/NOT-stage $v$ connected thereafter. The input stages are controlled by the signals $t_2$, $A_0$, and $l$.

The switching functions of the main storage units $S_{A0}$ to $S_{A3}$ of the counter of FIGURE 3 coincide with the switching functions of the main storage units of the counter according to FIGURE 1. The switching functions of the auxiliary storage units of the counter according to FIGURE 3 are as follows:

$H_0 = (t_2 \& \bar{l} \& z_1 \& A_0) \vee (H_0 \& e)$
$H_1 = (t_2 \& \bar{l} \& z_1 \& A_0 \& A_1) \vee (H_1 \& e)$
$H_2 = (t_2 \& \bar{l} \& z_1 \& A_0 \& A_1 \& A_2) \vee (H_2 \& e)$
$H_3 = (t_2 \& \bar{l} \& z_1 \& A_0 \& A_1 \& A_2 \& A_3) \vee (H_3 \& e)$
.
.
.

The auxiliary storage units of the counting stage having the order $2^1$ on upward can also have the following switching functions:

$H_1 = (t_2 \& \bar{l} \& z_1 \& A_0 \& A_1) \mathrm{v} (H_1 \& H_0)$
$H_2 = (t_2 \& \bar{l} \& z_1 \& A_0 \& A_1 \& A_2) \mathrm{v} (H_2 \& H_1 \& H_0)$
$H_3 = (t_2 \& \bar{l} \& z_1 \& A_0 \& A_1 \& A_2 \& A_3) \mathrm{v} (H_3 \& H_2 \& H_0)$ As can be seen, in auxiliary storage units constructed in accordance with these switching functions, the output signal $H_0$ of the auxiliary storage unit of the lowest counting stage is connected to all holding stages, and also, starting with the auxiliary storage unit of the counting stage having the order $2^2$, each auxiliary storage unit is controlled by the auxiliary signal of the preceding counting stage.

The signal from the respectively preceding stage, i.e., $H_1$ in case of the $H_2$ storage unit, $H_2$ in case of the $H_3$ unit and so forth, which is additionally applied to the holding stages of the auxiliary storage units can also be omitted. Thus, in both cases the auxiliary storage units, starting with the counting stage having the order $2^1$, have a different holding stage from that of the auxiliary storage units of the counter according to FIGURE 3. A counter whose auxiliary storage units are constructed as in the last-mentioned case is identical to the counter of FIGURE 3 if, in such an arrangement, the signal $e$ is replaced by the signal $H_0$. The disappearance of the output signals H of these varied auxiliary storage units is determined by the $H_0$ signal, because these storage units hold during the $H_0$ signal. If the $H_0$ signal becomes 0, all H signals of the subsequent storage units vanish, too; they are only delayed by one switching period. The chronological behavior of a counter having auxiliary storage units which are constructed in such a manner thus is more disadvantageous than the chronological behavior of the counter according to FIGURE 3, but it is better than the proposed counters. The example demonstrates that, under certain prerequisites, even though the H storage units are connected among one another, the upper limit frequency can be increased in comparison to the proposed counters, namely, in case an output signal of an H storage unit of a lower counting stage is passed through to higher counting stages. The limit frequency then does not have to diminish with the number of the counting stages.

Figure 4:
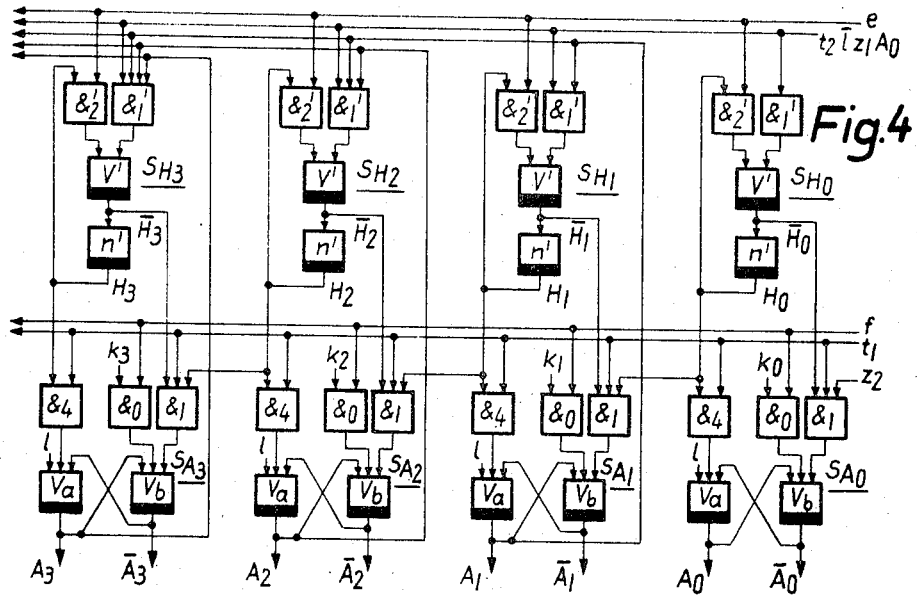
FIGURE 4 is a circuit diagram of a counter similar to that of FIGURE 3 but having different main storage units.

FIGURE 4 shows a binary counter which has evolved from the counter of FIGURE 3 by re-forming the main storage units. The auxiliary storage units of these counters are identical and are designated with like reference numerals. The main storage units comprise, respectively, two OR/NOT-stages $v_a$ and $v_b$. The output of the OR/NOT-stage $v_a$ is connected to the stage $v_b$ of the same storage unit and the output of the OR/NOT-stage $v_b$ is correspondingly connected to stage $v_a$. The OR/NOT-stage $v_b$ is controlled or activated by a setting stage $\&_1$, as well as, for the purpose of presetting, by the AND-stage $\&_0$. If all input signals of the stage $\&_1$ or the stage $\&_0$ correspond to L, the output $\bar{A}$ corresponds to 0 and the output A of the storage unit involved is L. After setting, the storage unit condition remains the same until clearing. The OR/NOT-stage $v_a$ is, in addition to being controlled by the clearing signal $l$, controlled by a clearing stage $\&_4$. If the clearing signal $1=L$, or if the input signals of the clearing stage $\&_4$ correspond to L, the output signal A will correspond to 0, and the output signal $\bar{A}$ of the storage unit involved will be L. After clearing, the storage unit condition is maintained until the following setting operation. In the following, the switching functions for the altered main storage units are given:

$A_0 = \overline{(t_1 \& H_0) \mathrm{v} l \mathrm{v} A_0 \mathrm{v} (t_1 \& z_2 \& \bar{H}_0)} \mathrm{v} (k_0 \& f)$ $A_1 = \overline{(t_1 \& H_1) \mathrm{v} l \mathrm{v} A_1 \mathrm{v} (t_1 \& H_0 \& \bar{H}_1)} \mathrm{v} (k_1 \& f)$ $A_2 = \overline{(t_1 \& H_2) \mathrm{v} l \mathrm{v} A_2 \mathrm{v} (t_1 \& H_1 \& \bar{H}_2)} \mathrm{v} (k_2 \& f)$ $A_3 = \overline{(t_1 \& H_3) \mathrm{v} l \mathrm{v} A_3 \mathrm{v} (t_1 \& H_2 \& \bar{H}_3)} \mathrm{v} (k_3 \& f)$ As has already been mentioned above, the number of inputs per counting stage increases with increasing digit order. In the embodiment of FIGURES 1, 3 and 4, for example, the number of inputs of the setting stages of the auxiliary storage units increases from counting stage to counting stage.

In the following, again the switching functions are listed for the setting stages of the auxiliary storage units:

$H_0$: $t_2 \& \bar{l} \& z_1 \& A_0$
$H_1$: $t_2 \& \bar{l} \& z_1 \& A_0 \& A_1$
$H_2$: $t_2 \& \bar{l} \& z_1 \& A_0 \& A_1 \& A_2$
$H_3$: $t_2 \& \bar{l} \& z_1 \& A_0 \& A_1 \& A_2 \& A_3$
$H_4$: $t_2 \& \bar{l} \& z_1 \& A_0 \& A_1 \& A_2 \& A_3 \& A_4$
$H_5$: $t_2 \& \bar{l} \& z_1 \& A_0 \& A_1 \& A_2 \& A_3 \& A_4 \& A_5$
$H_6$: $t_2 \& \bar{l} \& z_1 \& A_0 \& A_1 \& A_2 \& A_3 \& A_4 \& A_5 \& A_6$
$H_7$: $t_2 \& \bar{l} \& z_1 \& A_0 \& A_1 \& A_2 \& A_3 \& A_4 \& A_5 \& A_6 \& A_7$
$H_8$: $t_2 \& \bar{l} \& z_1 \& A_0 \& A_1 \& A_2 \& A_3 \& A_4 \& A_5 \& A_6 \& A_7 \& A_8$ Now, it may be desirable to be able to compose the counter of identical building blocks, each building block containing the circuit for one counting stage. If it is desired herein, for example, to limit the number of inputs in the setting stages of the auxiliary storage units to three, signals $h$ can be inserted, these signals $h$ being produced in separate circuits. The switching functions for signals $h$ are mentioned below:

$h_{0/2} = t_2 \& \bar{l} \& z_1 \& A_0$
$h_{3/5} = t_2 \& \bar{l} \& z_1 \& A_0 \& A_1 \& A_2 \& A_3$
$h_{6/8} = t_2 \& \bar{l} \& z_1 \& A_0 \& A_1 \& A_2 \& A_3 \& A_4 \& A_5 \& A_6$ In the following, the switching functions for the setting stages of the auxiliary storage units are listed, using the $h$ signals:

$H_0$: $h_{0/2} \& A_0$
$H_1$: $h_{0/2} \& A_1$
$H_2$: $h_{0/2} \& A_2 \& A_1$
$H_3$: $h_{3/5} \& A_3$
$H_4$: $h_{3/5} \& A_4$
$H_5$: $h_{3/5} \& A_5 \& A_4$
$H_6$: $h_{6/8} \& A_6$
$H_7$: $h_{6/8} \& A_7$
$H_8$: $h_{6/8} \& A_8 \& A_7$

As can be seen from the above listing, the signal $h_{0/2}$ is used for the auxiliary storage units of the counting stages $2^0$ to $2^2$; the signal $h_{3/5}$ is used for the auxiliary storage units of the counting stages $2^3$ to $2^5$, and the signal $h_{6/8}$ for the auxiliary storage units of the counting stages $2^6$ to $2^8$.

The auxiliary storage units for the signals $H_0$, $H_3$, $H_6$ . . . can comprise, in the simplest case, one setting stage with only one input, to which setting stage the newly introduced signals $h_{0/2}$, $h_{3/5}$, $h_{6/8}$ are connected. The additional signals $A_0$, $A_3$, $A_6$ in the above list are not necessarily required, for they are already contained in the signals $h_{0/2}$, $h_{3/5}$, $h_{6/8}$. The additional introduction of signals $A_0$, $A_3$, $A_6$ is of advantage if the fast counter is to be composed of identical building blocks for each counting stage. In this case, the output A of the main storage units can be connected, in each building block to the setting stage of the auxiliary storage unit. By introducing the signals $h$, only few inputs need be provided in the setting stages—for the example set forth, three inputs.

Figure 5A:
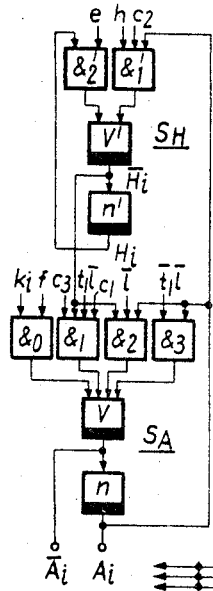
FIGURE 5a is a circuit diagram of a counter component including a main storage unit and an auxiliary storage unit.

FIGURE 5a shows the circuit for a counter component. The counter can be built up of such components if the signals $h$ are used. The counter component includes a main storage unit $S_A$ and an auxiliary storage unit $S_H$. Just as the counting stages of the counter according to FIGURE 3, the main storage unit has a setting stage $\&_1$, two holding stages $\&_2$, $\&_3$, as well as a stage $\&_0$ for the purpose of presetting. The auxiliary storage unit has a setting stage $\&_1'$ and a holding stage $\&_2'$.

In contradistinction to the counting stages of the counter of FIGURE 3, the stage $\&_1'$ of the counter component of FIGURE 5a has three inputs.

Figure 5B:
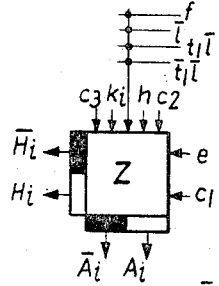

In FIGURE 5b, a symbol for a counting stage of FIGURE 5a is illustrated. The signals $f$, $\bar{l}$, $t_1\&\bar{l}$, $\bar{t}_1\&\bar{l}$, which are effective upon all counting stages of the counter are connected to a line, for the sake of simplicity. They are not connected with one another and as can be seen from FIGURE 5a, they are fed to the counting stages on different inputs.

Figure 6:
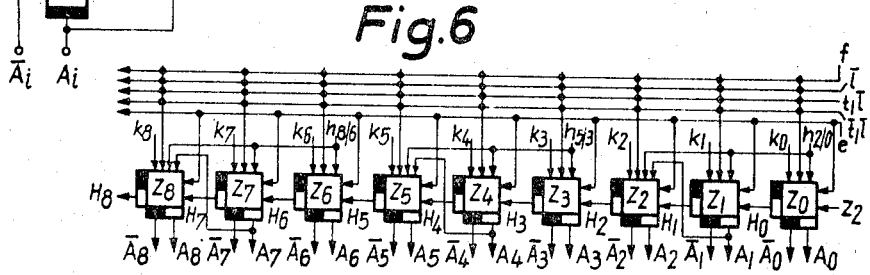
FIGURE 6 is a block diagram of a counter constructed with the components shown in FIGURE 5.

In FIGURE 6, the connection of the first nine counting stages of a binary counter with components according to FIGURE 5 is shown.

Figure 7:
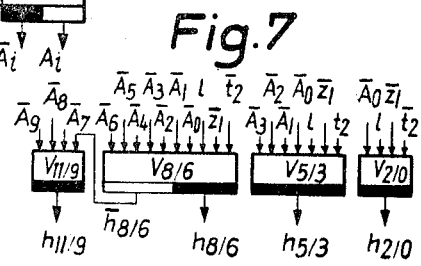
FIGURE 7 is a diagram showing an arrangement for producing signals $h$ for use in the counter of FIGURE 6.

The switching arrangements for the production of signals $h$ used in the counter according to FIGURE 6 are shown in FIGURE 7.

The signal $h_{2/0}$ is produced in an OR/NOT-stage $v_{2/0}$, which is controlled by signals $\bar{t}_2$, $\bar{z}_1$, $l$ and $\bar{A}_0$.

This OR/NOT-stage can be constructed using a diode-resistor combination with a transistor being subsequently connected. The transistor is symbolized by the black bar. The switching time of the stage is practically determined by the transistor switching time. The output signal $h_{2/0}$ thus occurs one transistor switching time period later, after the signal $\bar{A}_0$ occurs at the input of the OR/NOT-stage. This is the same instant at which the signal $A_0$ occurs at the counting stage $Z_0$. Thus, no delay is caused by the fact that instead of signal $A_0$—as in the counter of FIGURE 3—the signal $h_{2/0}$ is effective upon the auxiliary storage units of the counting stages $Z_0$, $Z_1$, $Z_2$, of the counter according to FIGURE 6.

Simultaneously with the production of signal $h_{2/0}$, there also appear the signals $h_{5/3}$ and $h_{8/6}$ at the further OR/NOT-stages $v_{5/3}$ and $v_{8/6}$ of FIGURE 7. The signals required for producing the signals $h_{5/3}$ and $h_{8/6}$ are addressed to the corresponding stages $v_{5/3}$ and $v_{8/6}$. The signal $h_{5/3}$ controls the counting stages $Z_3$ to $Z_5$ and the signal $h_{8/6}$ controls the counting stages $Z_6$ to $Z_8$ of the counter of FIGURE 6. There is no delay, either, because of the introduction of signals $h_{5/3}$ and $h_{8/6}$ in the counting operation in comparison to a counter such as that of FIGURE 3, because these signals, too, occur at the same instant as signals $A$ of the main storage units.

If, under certain conditions, further counting stages are present, further OR/NOT-stages may be provided, corresponding to the stages $v_{2/0}$, $v_{5/3}$, $v_{8/6}$, whose inputs further increase in number by respectively three. If the number of inputs to the OR/NOT-stages is limited, then a signal of the preceding stages can be employed—as is shown for the OR/NOT-stage $v_{11/9}$ of FIGURE 7. For this purpose, a NOT-stage is connected after the OR/NOT-stage $v_{8/6}$ which produces the signal $h_{8/6}$. This NOT-stage serves for the production of the negated signal $\bar{h}_{8/6}$. The stage which is connected after the first-mentioned stage is symbolized by a white bar. The signal $\bar{h}_{8/6}$ controls, together with the negated output signals $\bar{A}_7$, $\bar{A}_8$, $\bar{A}_9$, the OR/NOT-stage $v_{11/9}$ as shown in FIGURE 7. However, the signal produced by this stage, which signal serves for controlling the counting stages $Z_9$ to $Z_{11}$, occurs with a delay of two transistor switching times as compared to the $h$ signals for the preceding counting stages.

In the binary counters according to FIGURES 1, 3 and 4, the number of inputs in the setting stages $\&_1'$ of the auxiliary storage units increases from counting stage to counting stage, as has already been mentioned above. This is not actually necessary. In the following, the switching functions for a binary counter are set forth which likewise includes main and auxiliary storage units, wherein all auxiliary storage units have the same number of inputs and the number of inputs in the setting stages of the main storage units, as well as the number of the holding stages of the main storage units increases from counting stage to counting stage. (For the sake of simplicity, the clearing signal, the signal which releases the counting operation, and the signals required for presetting have been omitted in this example.)

$A_0 = (t_1\&\bar{H}_0)\vee(A_0\&\bar{t}_1)\vee(A_0\&H_0)$
$A_1 = (t_1\&\bar{H}_1\&H_0)\vee(A_1\&\bar{t}_1)\vee(A_1\&\bar{H}_1)\vee(A_1\&H_0)$
$A_2 = (t_1\&\bar{H}_2\&H_1\&H_0)\vee(A_2\&\bar{t}_1)$
$\qquad \vee(A_2\&\bar{H}_2)\vee(A_2\&\bar{H}_1)\vee(A_2\&H_0)$
$A_3 = (t_1\&\bar{H}_3\&H_2\&H_1\&H_0)\vee(A_3\&\bar{t}_1)$
$\qquad \vee(A_3\&\bar{H}_3)\vee(A_3\&\bar{H}_2)\vee(A_3\&\bar{H}_1)\vee(A_3\&H_0)$
.
.
.
$H_0 = (t_2\&A_0)\vee(H_0\&\bar{t}_2)\vee(H_0\&A_0)$
$H_1 = (t_2\&A_1)\vee(H_1\&\bar{t}_2)\vee(H_1\&A_1)$
$H_2 = (t_2\&A_2)\vee(H_2\&\bar{t}_2)\vee(H_2\&A_2)$
$H_3 = (t_2\&A_3)\vee(H_3\&\bar{t}_2)\vee(H_3\&A_3)$
.
.
.

Figure 8:
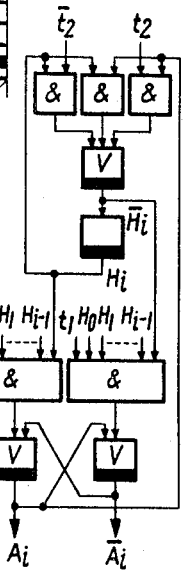
FIGURE 8 is a circuit diagram of a counter component having a different main storage unit than preceding counters.

In order to avoid an increase in the number of stages, the switching functions for the main storage units can be altered so that the main storage units are constructed in a similar manner as in the counter of FIGURE 4. In the following the altered switching functions are set forth:

$A_0 = \overline{(t_1\&H_0)\vee A_0}\vee(t_1\&\bar{H}_0)$
$A_1 = \overline{(t_1\&H_0\&H_1)\vee A_1}\vee(t_1\&H_0\&\bar{H}_1)$
$A_2 = \overline{(t_1\&H_0\&H_1\&H_2)\vee A_2}\vee(t_1\&H_0\&H_1\&\bar{H}_2)$
$A_3 = \overline{(t_1\&H_0\&H_1\&H_2\&H_3)\vee A_3}\vee(t_1\&H_0\&H_1\&H_2\&\bar{H}_3)$ A circuit arrangement for a counting stage with an altered main storage unit is shown in FIGURE 8. The signals which are applied together to the setting and clearing stage can again be combined in separate circuits—similar to the circuits of FIGURE 7.

Figure 9:
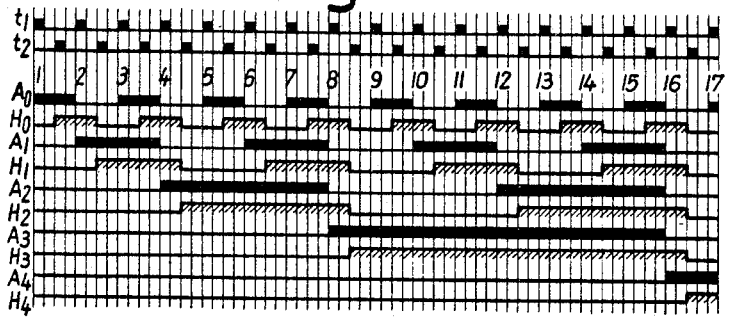
FIGURE 9 is a time plot of the signals appearing in the counter of FIGURE 8.

A signal diagram for a binary counter with counting stages constructed in this manner is illustrated in FIGURE 9.

Figure 19:
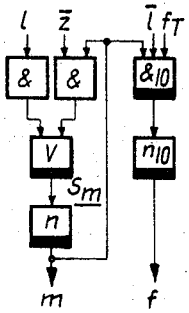
FIGURE 19 is a circuit diagram of a device for forming signal $f$.

All counters described in the foregoing have, if desired, for the purpose of presetting in connection with the main storage units of each counting stage, the input AND-stage $\&_0$. The stage $\&_0$ of the $i^{th}$ counting stage is controlled by a presetting signal $k_1$. The signals $k$ can be derived, for example, from switches or storage units. Furthermore, all these AND-stages $\&_0$ are together controlled by a presetting release signal $f$. In FIGURE 19, the means for production of this signal $f$ is illustrated.

For this purpose, there is used a storage unit $S_m$ having two input AND-stages $\&$, these AND-stages controlling an OR/NOT-stage $v$. A NOT-stage $n$ is connected after stage $v$. The output $m$ of this stage is fed back to an input AND-stage of the storage unit $S_m$. This input AND-stage is furthermore controlled by a negated counting command signal $\bar{z}$. The other AND-stage of this storage unit is controlled by a clearing signal $l$. The output signal $m$ of the storage unit $S_m$ appears with the occurrence of the signal $1=L$, and disappears with the occurrence of the signal $z=L$. An AND/NOT-stage $\&_{10}$ is connected after the storage unit $S_m$, this AND/NOT-stage controlling a NOT-stage $n_{10}$. The AND/NOT-stage $\&_{10}$ is furthermore controlled by the negated clearing signal $\bar{l}$ and a further signal $f_T$. This signal $f_T$ can be triggered, for example, by means of a key. In the presence of this signal and the two further input signals, the presetting release signal $f$ appears at the output of the NOT-stage $n_{10}$. The $f$ signal thus can only be produced after the counting content of the counter is cleared by the signal $1=L$ and up to the time of occurrence of the counting command signal $z=L$. During counting operation, a new presetting can already be prepared by means of the $k$ signals.

Figure 20:
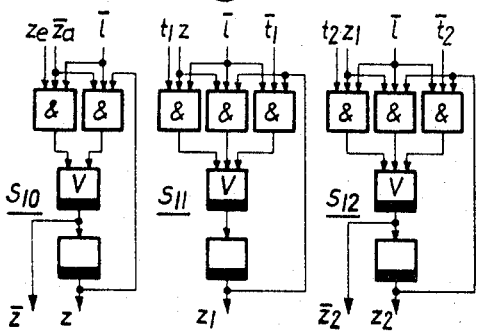
FIGURE 20 is a circuit diagram of a device for forming signals $z$, $z_1$ and $z_2$.

The production of the signals $z$, $z_1$, $z_2$, used in connection with the counters can be carried out, for example, by means of the storage units $S_{10}$, $S_{11}$, $S_{12}$ illustrated in FIGURE 20. The storage unit $S_{10}$ is, in addition to being controlled by the negated clearing signal $\bar{l}$, controlled by a signal $z_e$ and a negated signal $\bar{z}_a$. These signals can be produced, for example, by keys. By means of signal $z_e=L$, the storage unit $S_{10}$ is set; it is cleared by means of signal $z_a=L$.

From the counting command signal $z$, the signal $z_1$ is formed in storage unit $S_{11}$. Additionally, the storage unit $S_{11}$ is controlled by the signals $t_1$, $\bar{t}_1$ and $\bar{l}$. The signal $z_1$ occurs together with a $t_1$ signal, after $z=L$, and it disappears together with a $t_1$ signal after $z=0$ again. From the signal $z_1$, the signal $z_2$ is formed in the storage unit $S_{12}$. The storage unit $S_{12}$ is furthermore controlled by the signals $t_2$, $\bar{t}_2$ and $\bar{l}$. The output signal $z_2$ of this storage unit occurs together with a $t_2$ signal after $z_1=L$, and disappears with a $t_1$ signal, after $z_1=0$. By introducing the signals $z_1$, $z_2$ into the counter, it is possible to interrupt the counting operation at any desired counting content even if the signals to be counted continue to be fed to the counter.

Figure 10:
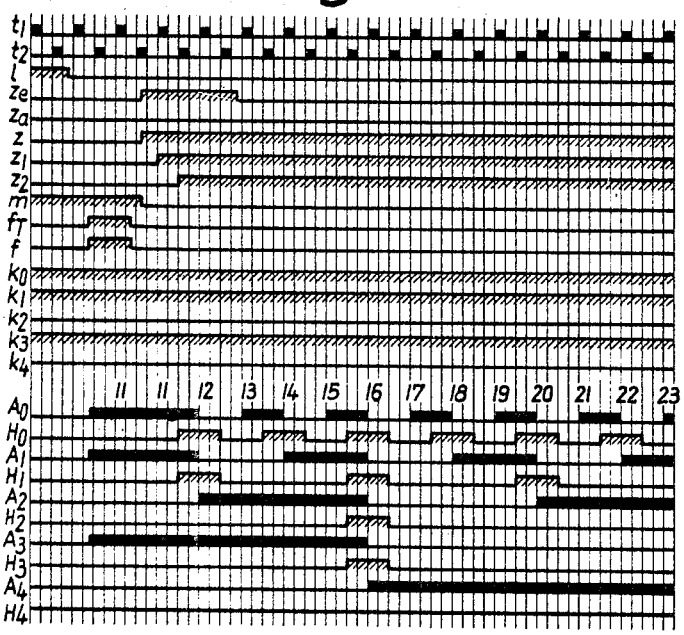
FIGURE 10 is a time plot of the signals appearing in the counter shown in FIGURE 1, 3, 4, and 6 when a number has been preset in the counter before counting begins.

The signal diagram according to FIGURE 2a is true for all mentioned binary counters according to FIGURES 1, 3, 4 and 6. On the right-hand side of the diagram, two counting interruptions are illustrated. The lower portion of the diagram shows a reverse counting operation. For this purpose, the negated signals $\bar{A}$ of the counting stages are employed. After the occurrence of the clearing signal $1=L$, the $\bar{A}$ outputs of the counter render the highest possible counter content. With each counting step, the counter content rendered by the $\bar{A}$ outputs diminishes. In FIGURE 10, the operation of presetting is shown by way of a signal diagram, for the counters according to FIGURES 1, 3, 4 and 6. With the occurrence of the signal $f=L$, the starting digit (11) set by the presetting signals $k$ is stored in the counter. With the first $t_1$ signal after $z_2=L$, the count is advanced to 12, and so forth.

The previously described binary counters can be converted in a simple manner to a decimal counter. Four respective counting stages then form a decade. Of the 16 possible counter contents or positions of a group of four counting stages of the binary counter, 6 counting positions must be suppressed. For this purpose, in each group of four counting stages of the binary counter the control of the holding stage of the auxiliary storage unit of the counting stage having the highest order within the group is varied for changing to a counting decade. Also, the control of the setting stage of the main storage unit of the counting stage of the second lowest order within the group is varied.

Figure 11:
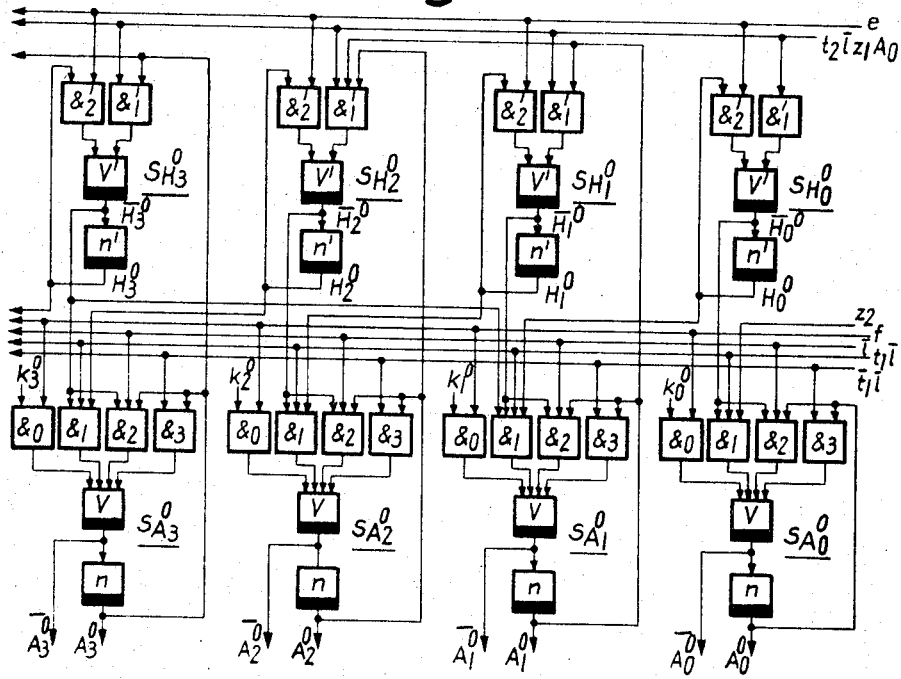
FIGURE 11 is a circuit diagram of four counter stages combined to form a decade.

FIGURE 11 shows, for exemplary purposes, the $0^{th}$ decade of a decimal counter derived from the binary counter of FIGURE 3. As can be seen, in the counter of FIGURE 11, as compared with the counter of FIGURE 3, the input signals $A_1$ and $A_2$ which are put out by the two preceding counting stages, are omitted in the holding stage of the auxiliary storage unit $S_{H3}$. In the setting stage of the main storage unit $S_{A1}$, in the counter of FIGURE 11, the signal $\bar{H}_3$ has been added.

Also, the decimal counter can be composed of identical structural counter components when using the signals $h$.

In the following, the switching functions for the setting stages of the auxiliary storage units of the first three decades of a decimally operating counter are set forth. The upper indicia provided in the designations for the output signals A and H of the main and auxiliary storage units refer to the respective decade, and the further indicia refer to the counting stage within a decade. The signal $A_i{}^j$ thus has the order of $2^i \cdot 10^j$.

$H_0{}^0$: $t_2 \& \bar{l} \& z_1 \& A_0{}^0$
$H_1{}^0$: $t_2 \& \bar{l} \& z_1 \& A_0{}^0 \& A_1{}^0$
$H_2{}^0$: $t_2 \& \bar{l} \& z_1 \& A_0{}^0 \& A_1{}^0 \& A_2{}^0$
$H_3{}^0$: $t_2 \& \bar{l} \& z_1 \& A_0{}^0 \& A_3{}^0$
$H_0{}^1$: $t_2 \& \bar{l} \& z_1 \& A_0{}^0 \& A_3{}^0 \& A_0{}^1$
$H_1{}^1$: $t_2 \& \bar{l} \& z_1 \& A_0{}^0 \& A_3{}^0 \& A_0{}^1 \& A_1{}^1$
$H_2{}^1$: $t_2 \& \bar{l} \& z_1 \& A_0{}^0 \& A_3{}^0 \& A_0{}^1 \& A_1{}^1 \& A_2{}^1$
$H_3{}^1$: $t_2 \& \bar{l} \& z_1 \& A_0{}^0 \& A_3{}^0 \& A_0{}^1 \& A_3{}^1$
$H_0{}^2$: $t_2 \& \bar{l} \& z_1 \& A_0{}^0 \& A_3{}^0 \& A_0{}^1 \& A_3{}^1 \& A_0{}^2$
$H_1{}^2$: $t_2 \& \bar{l} \& z_1 \& A_0{}^0 \& A_3{}^0 \& A_0{}^1 \& A_3{}^1 \& A_0{}^2 \& A_1{}^2$
$H_2{}^2$: $t_2 \& \bar{l} \& z_1 \& A_0{}^0 \& A_3{}^0 \& A_0{}^1 \& A_3{}^1 \& A_0{}^2 \& A_1{}^2 \& A_2{}^2$
$H_3{}^2$: $t_2 \& \bar{l} \& z_1 \& A_0{}^0 \& A_3{}^0 \& A_0{}^1 \& A_3{}^1 \& A_0{}^2 \& A_3{}^2$ The above switching functions can be simplified by the introduction of signals $h$, as follows:

$H_0{}^0 = (h^0 \& A_0{}^0)$
$H_1{}^0 = (h^0 \& A_1{}^0)$
$H_2{}^0 = (h^0 \& A_1{}^0 \& A_2{}^0)$
$H_3{}^0 = (h^0 \& A_3{}^0)$
$H_0{}^1 = (h^1 \& A_0{}^1)$
$H_1{}^1 = (h^1 \& A_1{}^1)$
$H_2{}^1 = (h^1 \& A_1{}^1 \& A_2{}^1)$
$H_3{}^1 = (h^1 \& A_3{}^1)$
$H_0{}^2 = (h^2 \& A_0{}^2)$
$H_1{}^2 = (h^2 \& A_1{}^2)$
$H_2{}^2 = (h^2 \& A_1{}^2 \& A_2{}^2)$
$H_3{}^2 = (h^2 \& A_3{}^2)$

Figure 12:
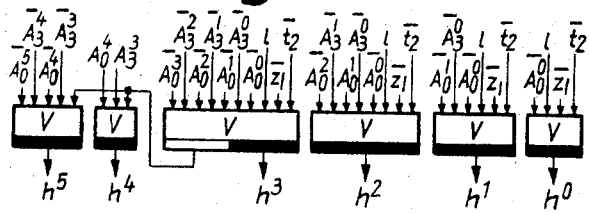
FIGURE 12 is a diagram showing an arrangement for producing $h$ signals for use in simplifying a decimal counter.

The signals $h$ occurring in the above-mentioned switching functions again are the combination of several signals. Below, the switching functions for the signals $h$ are set forth:

$h^0 = t_2 \& \bar{l} \& z_1 \& A_0{}^0$
$h^1 = t_2 \& \bar{l} \& z_1 \& A_0{}^0 \& A_3{}^0 \& A_0{}^1$
$h^2 = t_2 \& \bar{l} \& z_1 \& A_0{}^0 \& A_3{}^0 \& A_0{}^1 \& A_3{}^1 \& A_0{}^2$ The production of the signals $h$ again takes place in separate circuits, for example, as shown in FIGURE 12, in OR/NOT-stages. The signal $h^0$ controls those of the 1st decade, and so forth. When using these signals $h$, the decimal counter—as the binary counter described in the foregoing—is composed of counter components according to FIGURE 5.

Figure 13:
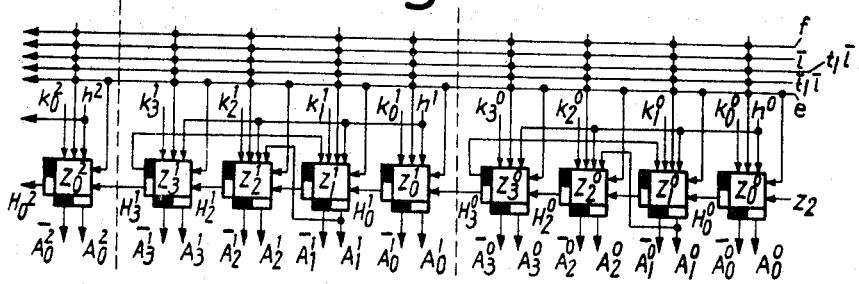
FIGURE 13 is a block diagram showing several decades of a decimal counter.

FIGURE 13 shows the first two decades and the lowest counting stage of the following decade of such a decimal counter. In the decimal counter also, there are no delays on account of the $\bar{h}$ signals, because the signals $h$ effective on the auxiliary storage units are produced at the same instant as the A signals of the main storage units.

Figure 14:
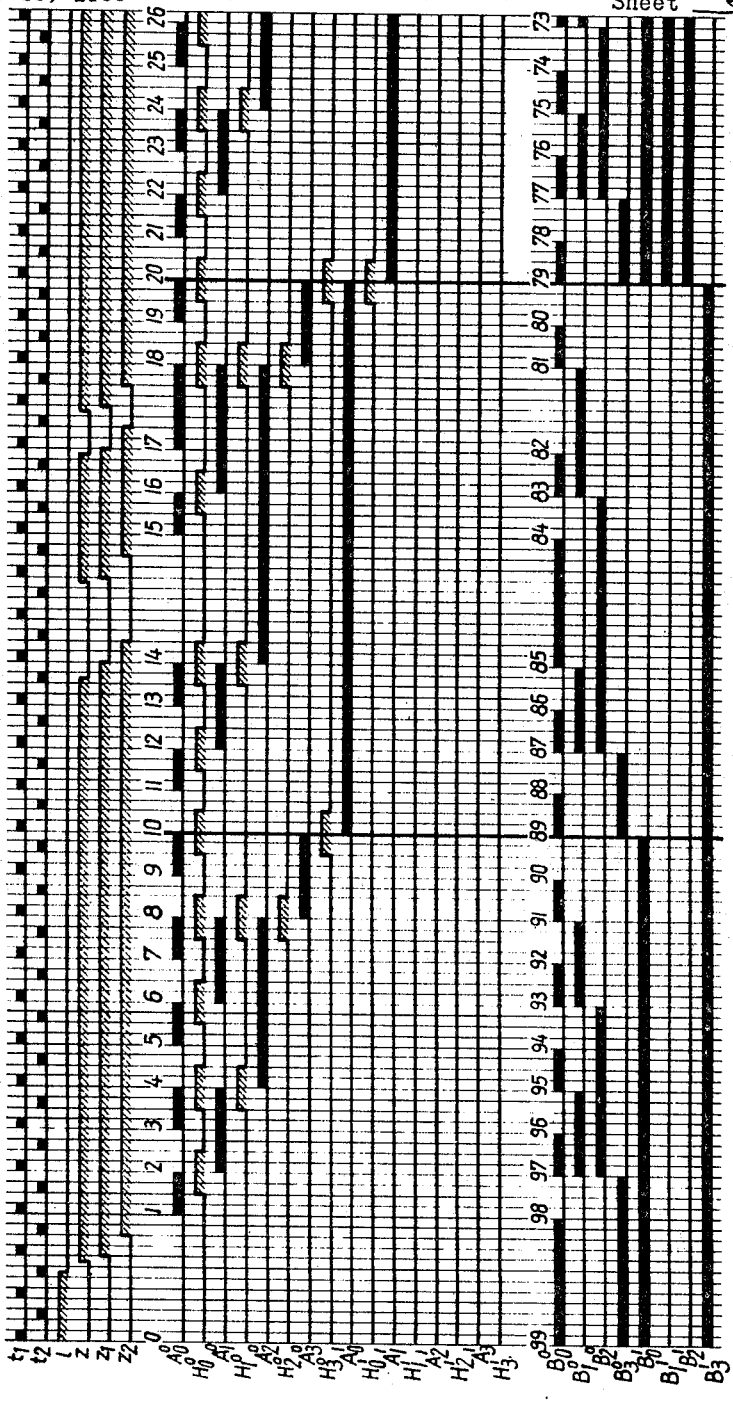
FIGURE 14 is a time plot of the signals appearing in a decimal counter without presetting.
Figure 21:
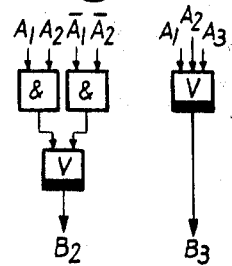
FIGURE 21 is a circuit diagram of a device for forming signals $B_2$ and $B_3$.

FIGURE 14 shows a signal diagram for a decimal counter without considering the presetting. In the lower portion, reverse counting is illustrated. For this purpose, signals $B_0$ to $B_3$ are produced for each decade, each of these signals forming the complement of the counter contents indicated by the signals $A_0$ to $A_3$. The signal $B_0$ is equal to the signal $\bar{A}_0$ and the signal $B_1$ is equal to the signal $\bar{A}_1$ of the decade pertaining thereto. The signals $B_2$ and $B_3$ can be produced in circuits as shown in FIGURE 21.

Figure 15:
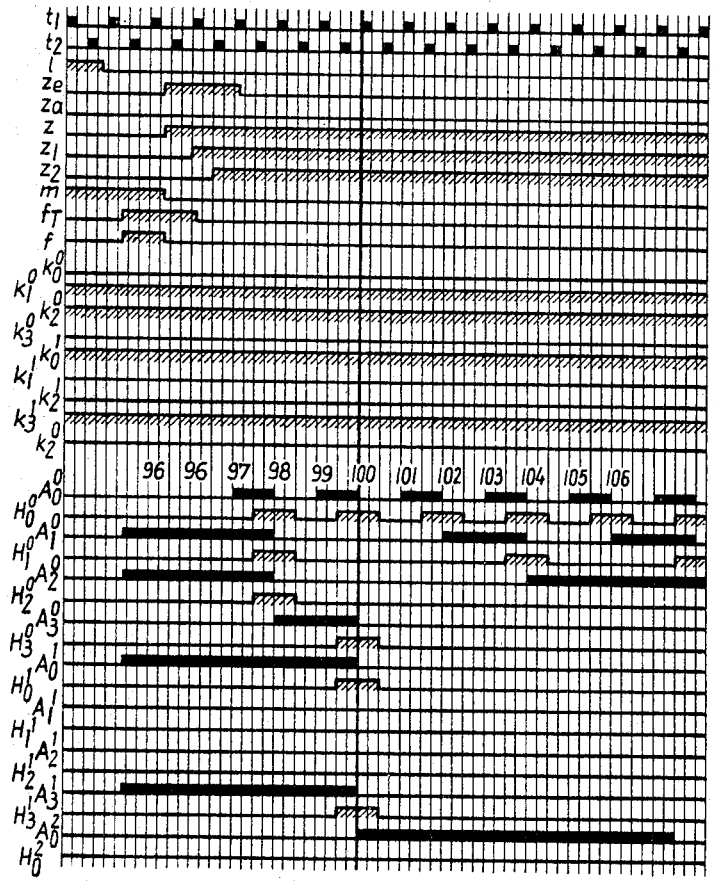
FIGURE 15 is a time plot of the signals appearing in a decimal counter with presetting.

FIGURE 15 shows a signal diagram for a decimal counter which has been preset, and in the example, there has been a presetting of a starting digit 96.

For converting a binary counter constructed with counting stages as shown in FIGURE 8 into a decimal counter, there is again formed a counting decade from each group of four counting stages of the binary counter. This is done by the additional introduction of a signal into each group. Thus, the setting stage of the main storage units of the second lowest order has a signal introduced from the counting stage having the highest order of the group. Also, two inputs of the clearing stage of the main storage unit are eliminated.

In the following, the switching functions for the $A_1$ and $A_3$ storage units, which functions were altered for purposes of the conversion, are set forth:

$A_1 = (t_1 \& \bar{H}_1 \& H_0 \& \bar{H}_3) \vee (A_0 \& \bar{t}_1) \vee (A_1 \& \bar{H}_1) \vee (A_1 \& \bar{H}_0)$
$A_3 = (t_1 \& \bar{H}_3 \& H_2 \& \bar{H}_1 \& H_0) \vee (A_3 \& \bar{t}_1) \vee (A_3 \& \bar{H}_3) \vee (A_3 \& \bar{H}_0)$ and for the modified main storage units, respectively, $$A_1 = \overline{(t_1 \& H_0 \& H_1) \vee A_1 \vee (t_1 \& H_0 \& \overline{H_1} \& \overline{H_3})}$$

$$A_3 = \overline{(t_1 \& H_0 \& H_3) \vee A_3 \vee (t_1 \& H_0 \& H_1 \& H_2 \& \overline{H_3})}$$

Figure 16:
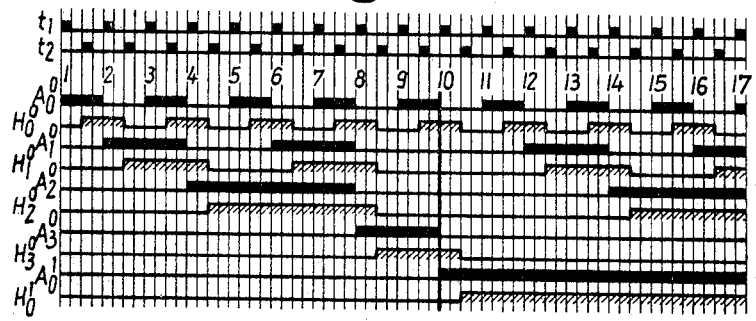
FIGURE 16 is a time plot of the signals from a counter constructed in accordance with FIGURE 8 modified for decimal counting.

FIGURE 16 shows a signal diagram for a decimal counter constructed from counting stages according to FIGURE 8. The variations required to be made in the $A_1$ and $A_3$ storage units for a decimal counting operation in accordance with the above switching functions should be noted.

Figure 17:
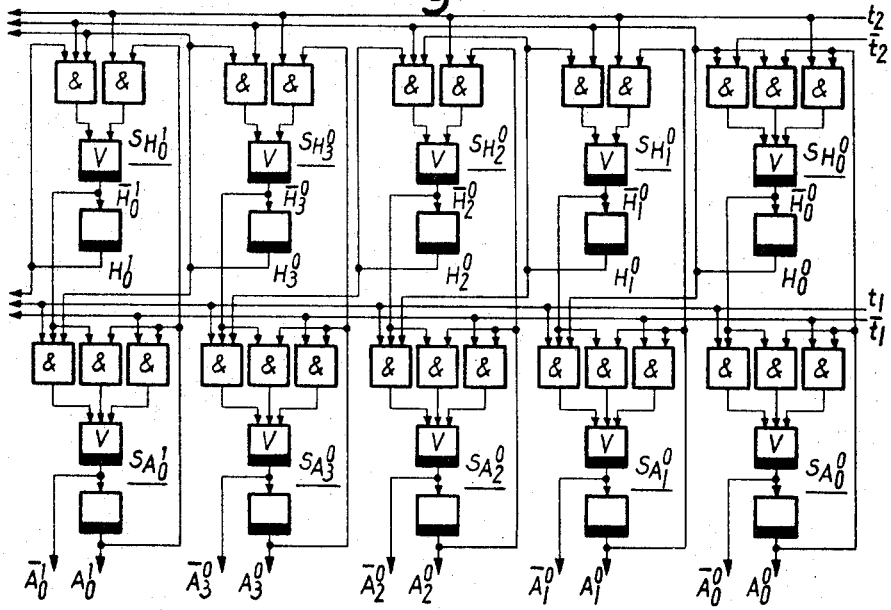
FIGURE 17 is a circuit diagram of a counter similar to that of FIGURE 11 but arranged for decimal counting.

FIGURE 17 shows a further decimal counter with main and auxiliary storage units. For the sake of simplicity, the clearing signal ($l$), the counting release signal ($z_2$) and the means for the presetting ($k\&f$) are being omitted. The construction and control of the main storage units coincide with those according to FIGURE 11. The number of inputs in the setting stages of the auxiliary storage units is the same in all decade counting stages in the counter of FIGURE 17, in contradistinction to the counter shown in FIGURE 11. However, in the counter of FIGURE 17 the number of inputs in the holding stages of the auxiliary storage units increases from decade counting stage to decade counting stage. Furthermore, the auxiliary storage units are connected with one another from decade counting stage to decade counting stage.

In the following, the switching functions for the auxiliary storage units are set forth. (The upper number (superscript) indicates the order of the decade and the lower number (subscript) indicates the order of the counting stage within the decade.)

$H_0^0 = (t_2 \& A_0^0) \vee (H_0^0 \& A_0^0) \vee (H_0^0 \& \overline{t}_2)$
$H_1^0 = (t_2 \& A_1^0) \vee (H_1^0 \& H_0^0)$
$H_2^0 = (t_2 \& A_2^0) \vee (H_2^0 \& H_0^0 \& H_1^0)$
$H_3^0 = (t_2 \& A_3^0) \vee (H_3^0 \& H_0^0)$
$H_0^1 = (t_2 \& A_0^1) \vee (H_0^1 \& H_3^0 \& H_0^0)$
$H_1^1 = (t_2 \& A_1^1) \vee (H_1^1 \& H_3^0 \& H_0^0 \& H_0^1)$
$H_2^1 = (t_2 \& A_2^1) \vee (H_2^1 \& H_3^0 \& H_0^0 \& H_0^1 \& H_1^1)$
$H_3^1 = (t_2 \& A_3^1) \vee (H_3^1 \& H_3^0 \& H_0^0 \& H_0^1)$ The previously described static counters, when carrying out a forward counting operation, deliver the counting result at the A outputs of the main storage units. The output signals A of the main storage units are set, by means of a clearing signal $1 = L$, to 0 ... 00. In the case of presettable counters, they are thereafter set to the respectively chosen digit. With the occurrence of the counting signals $t_1$, the digit symbolized by the output signals A increases by respectively one unit. For reverse counting, the negated output signals $\overline{A}$ of the main storage units are employed. With the clearing signal $1 = L$, the output signals $\overline{A}$ are set to the number $\alpha = L \ldots LL$. With presettable counters, after setting the presetting signals $k$ to the number $\gamma$ the output signals $\overline{A}$ are set to the number $\beta = \alpha - \gamma$. With each counting step, the number $\alpha$ or $\beta$, respectively diminishes by one unit.

If the digit set by the $k$ signals is to affect the $\overline{A}$ outputs of the counter (at which outputs the reverse counting operation takes place), an additional circuit must be connected in front of the counter, and this circuit forms the complement to the highest counter content. For reverse counting with the decimal counters according to the previously described arrangements, a further additional circuit has been introduced, which provides the complement of the digit put out by the A outputs to form 9 in each decade. At the outputs of this additional circuit, a reverse counting takes place in correspondence with that taking place in the binary counter at the $\overline{A}$ outputs.

Figure 22:
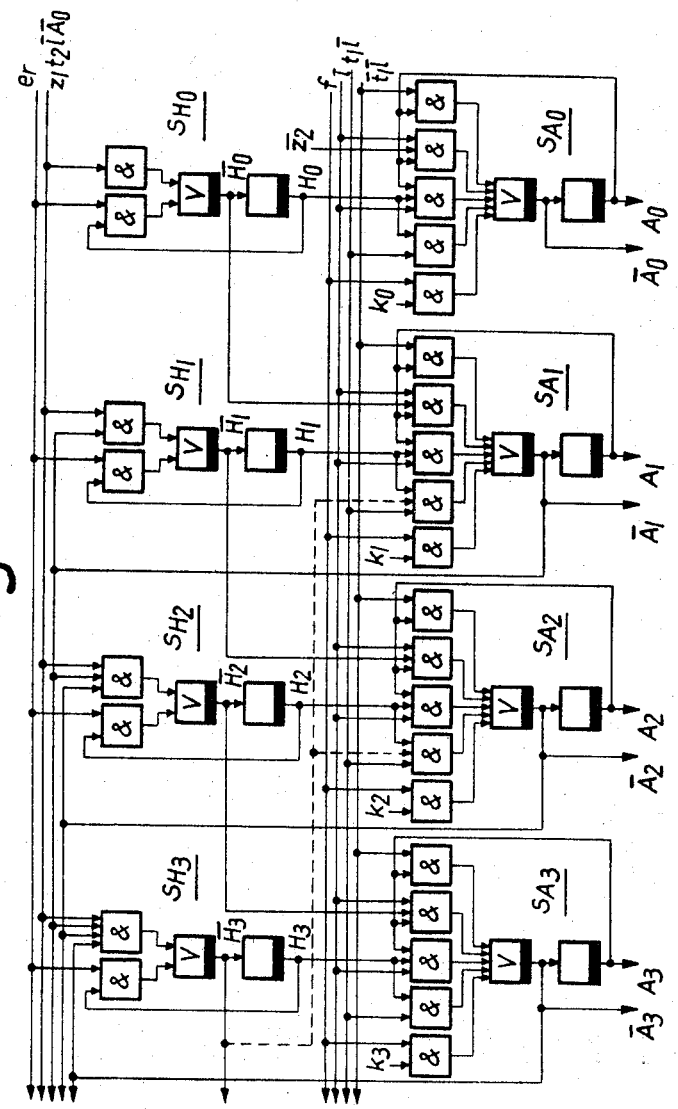
FIGURE 22 is a circuit diagram of a counter wherein reverse counting takes place at the A outputs.

In FIGURE 22, four counting stages of a binary reverse counter with presetting are illustrated wherein the reverse counting takes place directly at the YES outputs A of the storage units. If presetting is not desired, the AND-stages with the k inputs can be omitted. The counter again includes for each counting stage, main storage units $S_A$ with the outputs A and $\overline{A}$, as well as the auxiliary storage units $S_H$ with the outputs H and $\overline{H}$. They include AND/ OR-stages having NOT-stages connected thereafter. The significance of the indicated signals is the same as in the previously described embodiments. Signals indicated side-by-side at the inputs (for example, $\overline{A}_0 \& z_1 \& t_2 \& \overline{l}$) are combined in AND-stages which are not illustrated in further detail.

In the following, the switching functions for a counter according to FIGURE 22 are set forth:

$A_0 = (t_1 \& \overline{l} \& H_0) \vee (A_0 \& H_0 \& \overline{l})$
$\qquad \vee (A_0 \& \overline{z}_2 \& \overline{l}) \vee (A_0 \& \overline{t}_1 \& \overline{l}) \vee (k_0 \& f)$
$H_0 = (t_2 \& \overline{l} \& z_1 \& \overline{A}_0) \vee (H_0 \& e_r)$ for $n = 1, 2, 3, \ldots$ $A_n = (t_1 \& \overline{l} \& H_n) \vee (A_n \& H_n \& \overline{l})$
$\qquad \vee (A_n \& \overline{H}_{n-1} \& \overline{l}) \vee (A_n \& \overline{t}_1 \& \overline{l}) \vee (k_n \& f)$
$H_n = (t_2 \& \overline{l} \& z_1 \& \overline{A}_0 \& \overline{A}_1 \& \ldots \overline{A}_n) \vee (H_n \& e_r)$ The signal $e_r$ applied in parallel to the auxiliary storage units of the counting stages conducts the following switching function:

$e_r = (\overline{A}_0 \& \overline{l}) \vee (\overline{t}_2 \& \overline{l})$ or $\overline{e}_r = l \vee (A_0 \& t_2)$ or $e_r = H_0 \& l$ FIGURE 23 shows a circuit which could be used for this purpose.

In the counter according to FIGURE 22, the counting signal is effective in parallel at all main storage units, and the auxiliary counting signal is effective in parallel at all auxiliary storage units. Furthermore, the output signals of the main storage units are applied only to auxiliary storage units, and the output signals of the auxiliary storage units are applied only to main storage units.

In the counter according to FIGURE 22, the number of inputs of the setting stages of the auxiliary storage units increases by one, respectively, from counting stage to counting stage.

If the reverse counter is to be composed of identical structural components for each respective counting stage, wherein, for example, the number of inputs of the setting stage the auxiliary storage unit is limited to four, input signals are combined into signals $\eta$ in separate circuits, as set forth below.

There are:

$\eta_{3/0} = t_2 \& \overline{l} \& z_1 \& \overline{A}_0$
$\eta_{7/4} = t_2 \& \overline{l} \& z_1 \& \overline{A}_0 \& \overline{A}_1 \& \overline{A}_2 \& \overline{A}_3 \& \overline{A}_4$
$\eta_{11/8} = \eta_{7/4} \& \overline{A}_5 \& \overline{A}_6 \& \overline{A}_7 \& \overline{A}_8$
$\eta = {}_{15/12} = \eta_{7/4} \& \overline{A}_5 \& \overline{A}_6 \& \overline{A}_7 \& \overline{A}_8 \& \overline{A}_9 \& \overline{A}_{10} \& \overline{A}_{11} \& \overline{A}_{12}$ Using these signals $\eta$, the following switching functions result for the setting stages of the auxiliary storage units:

$H_0$: $\eta_{3/0} \& \overline{A}_0$
$H_1$: $\eta_{3/0} \& \overline{A}_1$
$H_2$: $\eta_{3/0} \& \overline{A}_1 \& \overline{A}_2$
$H_3$: $\eta_{3/0} \& \overline{A}_1 \& \overline{A}_2 \& \overline{A}_3$
$H_4$: $\eta_{7/4} \& \overline{A}_4$
$H_5$: $\eta_{7/4} \& \overline{A}_5$
$H_6$: $\eta_{7/4} \& \overline{A}_5 \overline{A}_6$
$H_7$: $\eta_{7/4} \& \overline{A}_5 \& \overline{A}_6 \& \overline{A}_7$ FIGURE 24a shows the circuit for a counter component for reverse counters. The setting stage of the auxiliary storage unit $S_H$ in this counter component has four inputs. In FIGURE 24b, a symbol for this counter component is shown. The signals $f$, $\overline{l}$, $t_1 \& \overline{l}$, $\overline{t}_1 \& \overline{l}$, $e_r$ which are effective upon all counting stages of the counter are applied, for the sake of simplicity, to one line. They are not connected with one another and pass, as can be seen from FIGURE 24a, to different inputs of the counting stages.

The circuit of the counting stage of FIGURE 24a, or the symbol pertaining thereto as shown in FIGURE 24b, is provided with inputs $C_1$ to $C_4$ which, when connected to form counters, have different signals applied to them.

Figure 25A:
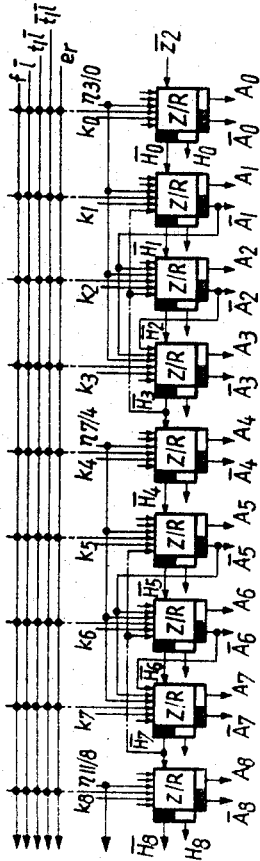
FIGURE 25a is a block diagram of a counter using the components of FIGURE 24.
Figure 25B:
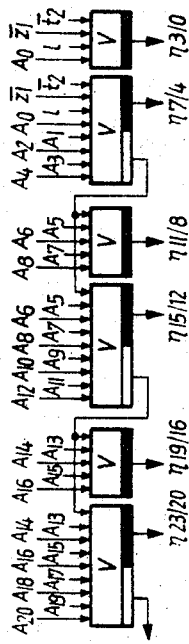
FIGURE 25b is a block diagram of a device for forming the $\eta$ signals.

FIGURE 25a shows the combining of the first nine counting stages of a binary counter with components according to FIGURE 24. As identical components $Z/R$ are employed for all counting stages, several component inputs C are not provided with circuits. The circuit arrangement for the formation of the signals η used in connection with this counter is shown in FIGURE 25b.

Figure 26:
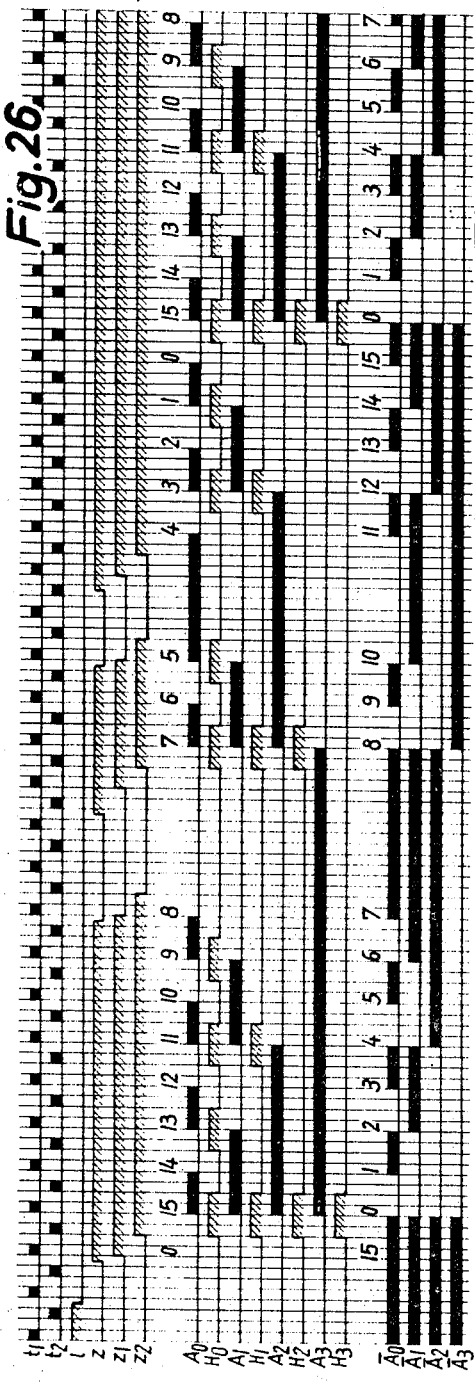
FIGURE 26 is a time plot of the signals of the circuits of FIGURES 22 and 25 without presetting.

FIGURE 26 shows a signal diagram for a four-stage reverse counter according to FIGURE 22 and FIGURE 25, without considering the presetting step. If the clearing signal 1=L occurs, all of the main and auxiliary storage units of the counter are cleared. With the occurrence of the first counting signal $t_1$ after the counting release signal $z_2=L$, the counter renders at the A outputs the highest counter content—in the example, the digit 15—as is set forth also in the signal diagram. With the subsequent counting signal $t_1$, the count advances to 14. With the subsequent counting signal, the count advances to 13, and so forth. After reaching the number 0, the counter again, when the following counting signal $t_1=L$, assumes the higher counter content 15. At the subsequent counting signal $t_1=L$, the count goes to 14, and so forth. The auxiliary signals $H_0$ to $H_3$ of the auxiliary storage units assigned to the main storage units are produced in such a manner that they always equal L at the instant of the occurrence (L) of an output signal A, and that they always equal 0 at the instant of the disappearance (0) of an output signal A. This can also be seen from the signal diagram. The auxiliary signals $H_0$ to $H_3$ have the task to differentiate the front flank and rear flank of the output signals A of the main storage units.

The counting operation is conducted only if $z_2=L$. When $z_2=0$ the counter content reached is maintained. Two counting interruptions are shown in the diagram. In the signal diagram, there are also indicated the negated output signal $\overline{A}_0$ to $\overline{A}_3$, which represent the complementary number to form, together with the number represented by the signals A, the highest counter content. Thus, at the outputs $\overline{A}$ of the reverse counter, a forward counting operation is carried out.

Figure 27:
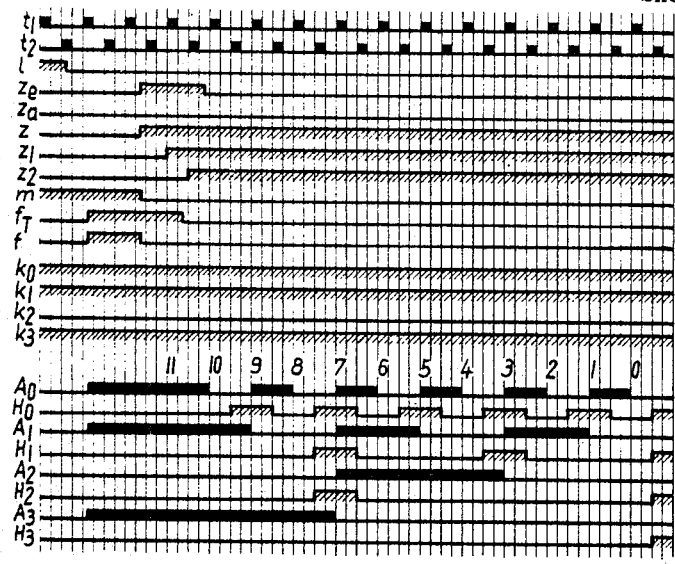
FIGURE 27 is a time plot of the signals of the circuits of FIGURES 22 and 25 with presetting.

FIGURE 27 shows a signal diagram for the counters of FIGURES 22 and 25 wherein presetting is first performed. The k signals are the presetting signals. During the occurrence of the signal $f=L$, the presetting signals $k_0$ to $k_3$ are stored in the counter. First, the number 11 is selected. After the counting release signal $z_2=L$, the counter counts to 10, at the subsequent counting signal $t_1=L$. At the following counting signal $t_1=L$, it counts to 9, and so forth. The reverse counting thus takes place starting with the preset digit.

The binary counters can be converted to decimal counters in a simple manner. In such case, each counting decade includes four counting stages. For this purpose, as indicated in FIGURE 22 in dashed lines, the signal $\overline{H}_3$ of the auxiliary storage unit $S_{H3}$ is fed back to the main storage units $S_{A1}$ and $S_{A2}$. It is effective as a blocking signal. If the signal $\overline{H}_3$ of the auxiliary storage unit $S_{H3}$ corresponds to 0, the storage units $S_{A1}$ and $S_{A2}$ are not set. Thus, a 9 appears with the counting signal $t_1$ following the zero setting of a decade. In FIGURE 25, the changes for the decimal counter are indicated by dot-dash lines.

Figure 28:
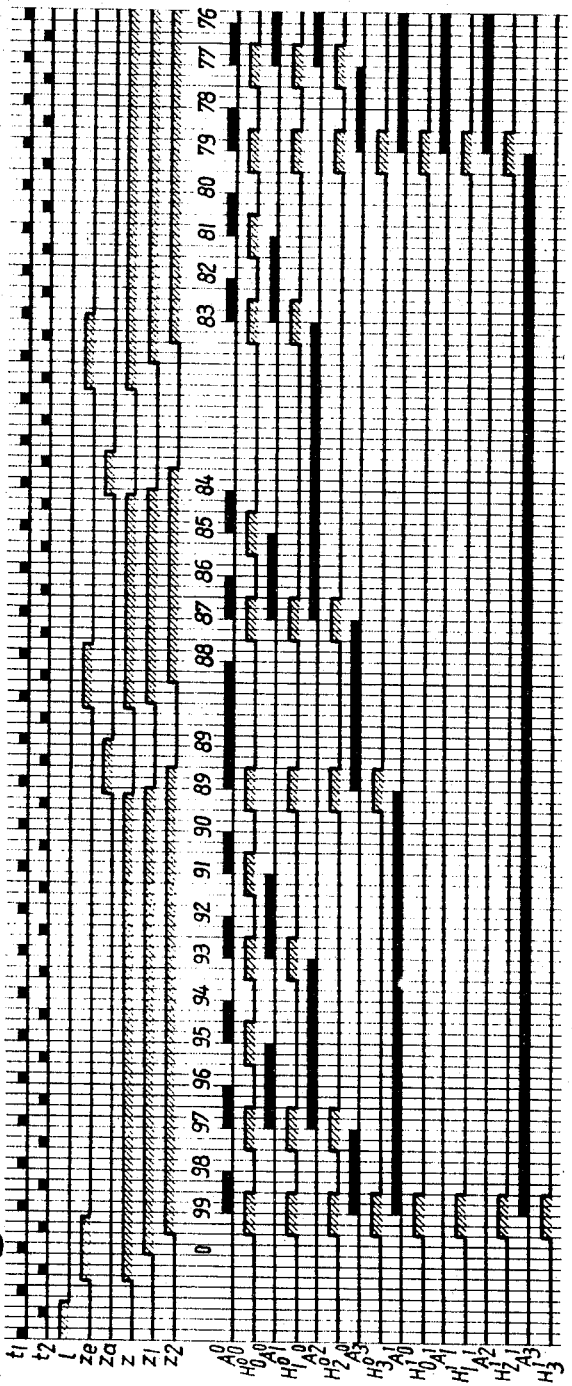
FIGURE 28 is a time plot of the signals of a two decade decimal counter without presetting.

FIGURE 28 is a signal diagram for a two-decade decimal counter without presetting. Upon the occurrence of thet clearing signal 1=L, all main and auxiliary storage units of the decimal counter are cleared. If the counting release signal $z_2=L$, the reverse counting operation starts with the subsequent counting signal $t_1=L$. Then, the counter puts out the highest counter content, in the example the digit 99. Upon the occurrence of the following counting signals, the counter proceeds counting backward, as is also shown in the signal diagram.

Figure 29:
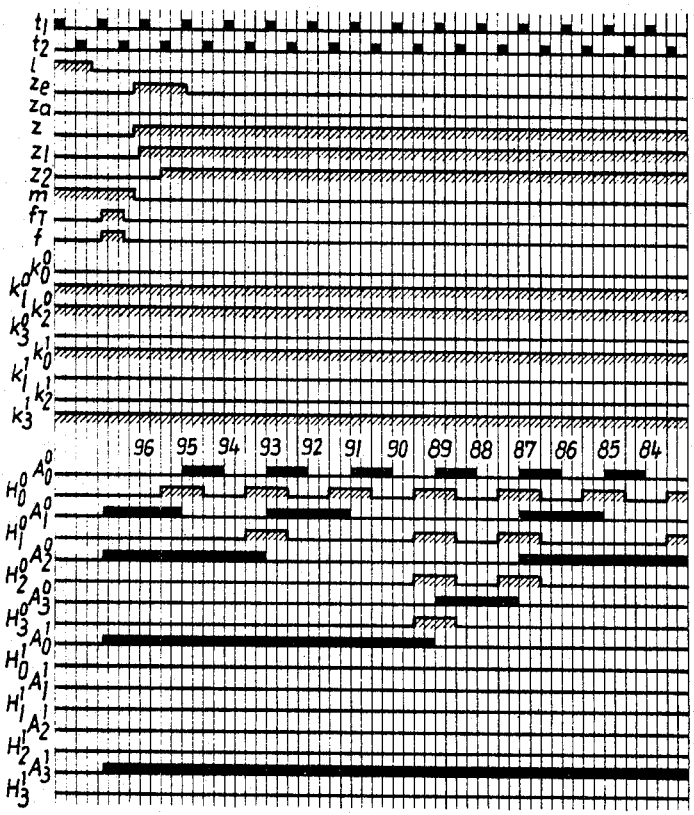
FIGURE 29 is a time plot of the signals of a two decade decimal counter with presetting.

FIGURE 29 is a signal diagram for a decimal counter which has been preset. The diagram shows a decimal reverse counting starting with the digit 96.

As the signal diagrams demonstrate, the signal $H=L$ upon the occurrence of a signal A which is put out by the same counting stage. Upon the disappearance of a signal A, signal $H=0$. This condition is not necessary. In the following, reverse counters are set forth in which the auxiliary signal assigned to an A signal is 0 at the beginning of the A signal and is L at the end of the A signal.

FIGURE 30 shows such a binary reverse counter. As can be seen, the number of inputs in the setting stages of the main and auxiliary storage units increases in this counter. The following indicates the switching functions of the counter:

$A_0 = (t_1 \& \bar{l} \& z_2 \& \overline{H}_0) v (A_0 \& \overline{H}_0 \& \bar{l}) v (A_0 \& \bar{t}_1 \& \bar{l}) v (k_0 \& f)$
$H_0 = (t_2 \& \bar{l} \& z_1 \& A_0) v (H_0 \& e)$ with $e = (A_0 \& \bar{l}) v (\bar{t}_2 \& \bar{l})$ or
$\bar{e} = \bar{l} v (\overline{A}_0 \& t_2)$ for $n = 1, 2, 3, \ldots$ $A_n = (t_1 \& \bar{l} \& z_2 \& \overline{H}_0 \& \overline{H}_1 \& \overline{H}_2 \& \ldots \overline{H}_n) v (A_n \& \overline{H}_n \& \bar{l})$
$\qquad v (A_n \& \bar{t}_1 \& \bar{l}) v (k_n \& f)$
$H_n = (t_2 \& \bar{l} \& z_1 \& \overline{A}_0 \& \overline{A}_1 \& \overline{A}_2 \& \ldots \overline{A}_{n-1} \& A_n) v (H_n \& e_r)$ with $e_r = (\overline{A}_0 \& \bar{l}) v (\bar{t}_2 \& \bar{l})$ or
$\bar{e}_r = \bar{l} v (A_0 \& t_2)$ The signal $e$ is formed in the same manner as in the forward counter described previously, and the signal $e_r$ is formed as in the case of the counters of FIGURES 22 and 25.

If this counter is to be constructed of identical counter components, too, then input signals of the setting stages can be combined in separate circuits in a manner similar to that set forth for the counter of FIGURE 25.

Figure 31:
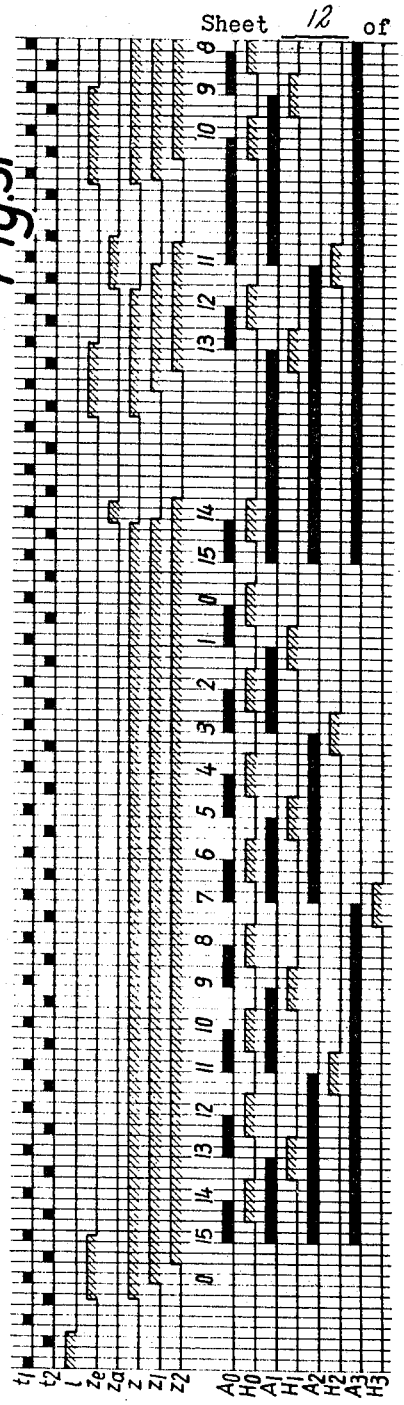
FIGURE 31 is a time plot of the counter of FIGURE 30 without presetting.

FIGURE 31 is a signal diagram for such a counter and wherein presetting is not used.

For converting the counter of FIGURE 30 into a decimal counter a signal formed in accordance with the switching function $g = H_2 v H_3$ is applied to the setting stage of the storage unit $S_{A1}$. The signal $H_3$ is applied to the setting stage of the storage unit $S_{A2}$ as indicated by the dashed line. The input signals $\overline{H}$ of these two setting stages can, but need not, be omitted. In the case of multi-decade counters, four respective counting stages are converted into a counting decade in this manner.

Figure 32:
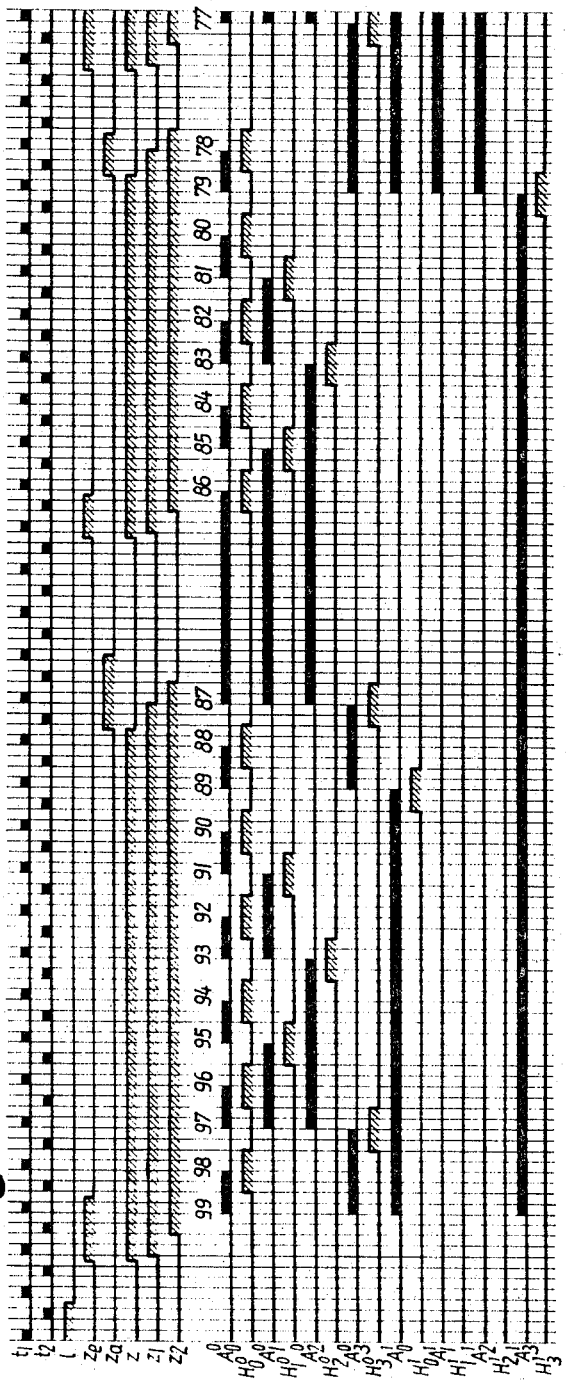
FIGURE 32 is a time plot of a similar counter for decimal counting and without presetting.

FIGURE 32 is a signal diagram of such a decimal counter with two decades, and wherein presetting is not performed.

FIGURE 33 is an embodiment showing the first four counting stages of a binary counter wherein a forward counting operation takes place at the A outputs.

Figure 34:
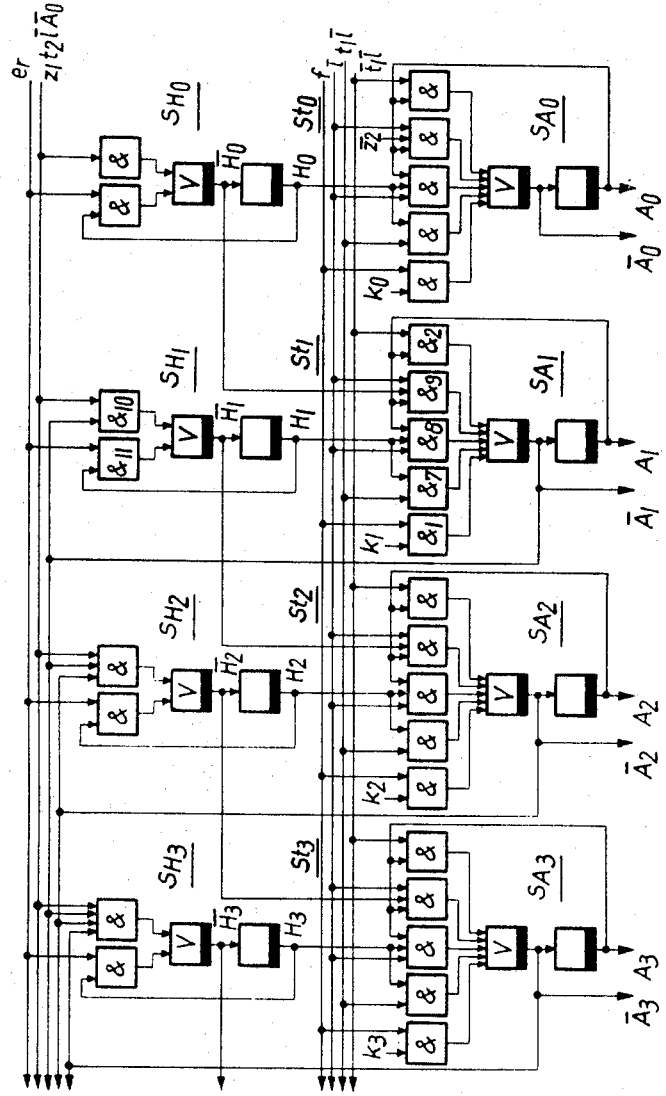
FIGURE 34 is a circuit diagram of a binary counter where reverse counting takes place at the outputs A.

FIGURE 34 is an embodiment of a binary counter wherein a reverse counting takes place at the A outputs.

The signals $e_v$ and $e_r$ occurring in the above-mentioned FIGURES 33 and 34 are produced in circuits as shown in FIGURES 35a and 35b.

Figure 36:
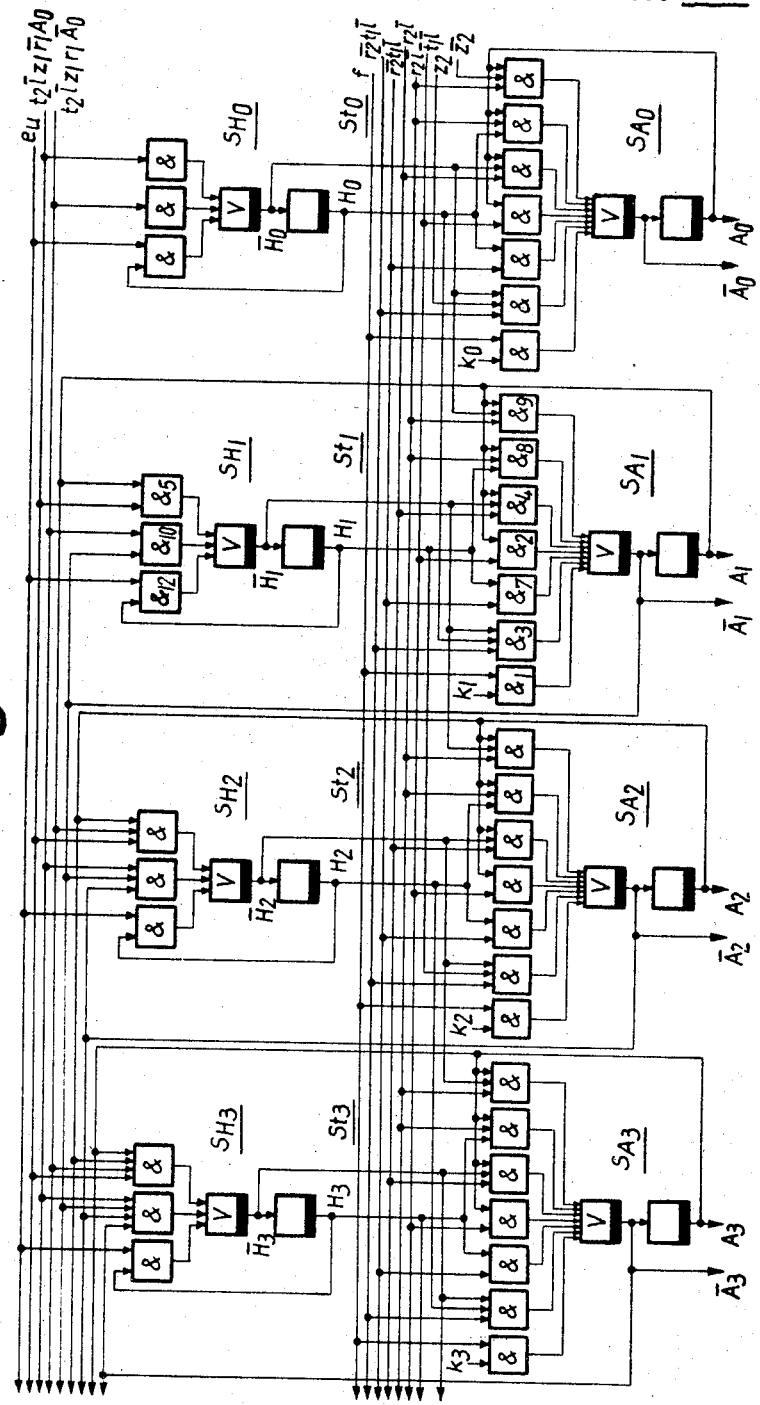
FIGURE 36 is a circuit diagram of a counter where forward and reverse counting may occur.

FIGURE 36 shows a binary forward-reverse counter which is reversible. This counter is a hybrid of the counters of FIGURES 33 and 34 formed by combining the input stages of the storage units and by introducing a switch-over or function reversing signal. For this purpose, those input stages of a counting stage, which are identical in both counters (FIGURE 33 and FIGURE 34) are incorporated unchanged. For example, the AND-stages &$_1$, &$_2$ from the counting stage $St_1$ are incorporated and are designated &$_1$, &$_2$ in FIGURE 36. The input stages &$_3$ to &$_5$ of the counting stage $St_1$ of the counter of FIGURE 33 are incorporated with the additional provision of a negated switch-over signal $\bar{r}$. These input stages are also designated &$_3$ to &$_5$ in FIGURE 36. The input stages &$_7$ to &$_{10}$ of the counting stage $St_1$ of the counter of FIGURE 34 are incorporated with the additional provision of a switch-over signal $r$ and also have the same reference numerals in FIGURE 36. Furthermore, the AND-stage &$_6$ of the counting stage $St_1$ of the counter of FIGURE 33, after adding the signal $\bar{r}$, and the AND-stage $\&_{11}$ of the counting stage $St_1$ of the counter of FIGURE 34, after adding the signal $r$, could form two further input stages of the counting stage $St_1$ of the reversible counter of FIGURE 36. In place of these two input stages, the counting stage $St_1$ of the counter of FIGURE 36 contains the input stage $\&_{12}$. This input stage $\&_{12}$ contains, as do the AND-stages $\&_6$, $\&_{11}$ the fed back signal $H_1$ and an input signal $e_u$, derived from the signals $e_v$, $e_r$ and the switch-over signals. The other counting stages of the counter of FIGURE 36 have been constructed in the same manner as the counting stage $St_1$.

As FIGURE 36 shows, several signals are addressed to various inputs of the circuit arrangement. The respective signals are combined and by AND-stages and this is not further shown. The signals $\bar{r}_1$, $t_2$, $\bar{l}$, $z_1$, $A_0$ which are, for example, effective at all auxiliary storage units, are applied to an AND-stage with separate inputs and the output of this AND-stage is connected to the auxiliary storage units.

The command signal $r$ for reversing the counting direction can occur at any desired instant. The meanings are: $r=0$, "count forward," $r=L$ "count backward." In order to assure fault-free switching over of the counter to the desired counting direction, release signals $r_1$, $r_2$ for reversing the counting direction are suitably formed from the signal $r$, and these are applied to the counter instead of the signal $r$, as is illustrated in FIGURE 36.

Figure 37A:
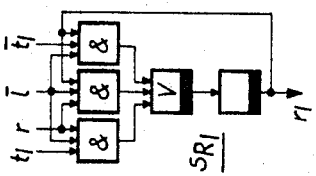
FIGURE 37a is a circuit diagram of a device for forming signal $r_1$.
Figure 37B:
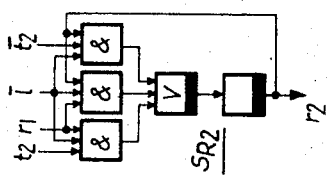
FIGURE 37b is a circuit diagram of a device for forming signal $r_2$.

FIGURES 37a and 37b show a circuit arrangement for producing the signal $r_1$, $r_2$. This arrangement includes two storage elements $S_{R1}$, $S_{R2}$.

The signal $r_1$ is formed from the signal $r$ by means of the storage unit $S_{R1}$ in such manner that it occurs together with the first counting signal $t_1$, after $r=L$, and disappears with the first counting signal $t_1$, after $r=0$. The signal $r_2$ is formed from the signal $r_1$ by means of the storage unit $S_{R2}$ in such manner that it occurs together with the first auxiliary counting signal $t_2$, after $r_1=L$, and disappears with the first auxiliary counting signal $t_2$, after $r_1=0$. The start and the end of $r_1$ are undetermined over a range for which $t_1=L$, for the signal $r$ can change its condition also during a $t_1$ signal. In contradistinction to this, a change in the condition of the $r_2$ signal takes place with the beginning of an auxiliary counting signal $t_2$, because the signals $t_1$, $t_2$ occur at different times.

In the following, the switching functions for the storage elements $S_{R1}$, $S_{R2}$, in order to form the signals $r_1$, $r_2$, as well as for the counting stages of the counter of FIGURE 36 are set forth:

$r_1 = (t_1 \& \bar{l} \& r) \vee (r_1 \& r \& \bar{l}) \vee (r_1 \& \bar{t}_1 \& \bar{l})$
$r_2 = (t_2 \& \bar{l} \& r_1) \vee (r_2 \& r_1 \& \bar{l}) \vee (r_2 \& \bar{t}_2 / \bar{l})$
$A_0 = (\bar{r}_2 \& t_1 \& \bar{l} \& z_2 \& \overline{H}_0) \vee (\bar{r}_2 \& t_1 \& \bar{l} \& H_0)$
$\qquad \vee (A_0 \& \bar{t}_1 \& \bar{l}) \vee (A_0 \& \bar{r}_2 \& \bar{l} \& \overline{H}_0) \vee (A_0 \& r_2 \& \bar{l} \& H_0)$
$\qquad \vee (A_0 \& r_2 \& \bar{l} \& \bar{z}_2) \vee (k_0 \& f)$
$H_0 = (\bar{r}_1 \& t_2 \& \bar{l} \& z_1 \& A_0) \vee (r_1 \& t_2 \& \bar{l} \& z_1 \& \overline{A}_0) \vee (H_0 \& e_u)$
for $n=1, 2, 3 \ldots$
$A_n = (\bar{r}_2 \& t_1 \& \bar{l} \& H_{n-1} \& \overline{H}_n) \vee (\bar{r}_2 \& t_1 \& \bar{l} \& H_n)$
$\qquad \vee (A_n \& \bar{t}_1 \& \bar{l}) \vee (A_n \& \bar{r}_2 \& \bar{l} \& \overline{H}_n) \vee (A_n \& r_2 \& \bar{l} \& H_n)$
$\qquad \vee (A_n \& r_2 \& \bar{l} \& \overline{H}_{n-1}) \vee (k_n \& f)$
$H_n = (\bar{r}_1 \& t_2 \& \bar{l} \& z_1 \& A_0 \& A_1 \& \ldots$
$\qquad A_n) \vee (r_1 \& t_2 \& \bar{l} \& z_1 \& \overline{A}_0 \& \overline{A}_1 \& \ldots \overline{A}_n) \vee (H_n \& e_u)$ with
$e_u = (\bar{t}_2 \& \bar{l}) \vee (\bar{r}_1 \& A_0 \& \bar{l}) \vee (r_1 \& \overline{A}_0 \& \bar{l})$
or
$\bar{e}_u = l \vee (\bar{r}_1 \& t_2 \& \overline{A}_0)$
$\vee (r_1 \& t_2 \& A_0)$ FIGURE 38 shows an example of a circuit for producing the signal $e_u$.

In the counter of FIGURE 36, the counting signal is effective in parallel at all auxiliary storage units. Furthermore, the output signals of the main storage units are applied only to auxiliary storage units, and the output signals of the auxiliary storage units are applied only to main storage units. In the counter of FIGURE 36, the number of inputs in the two setting stages of the auxiliary storage units increase by one respectively from counting stage to counting stage.

If the reversible function forward-reverse counter is to be composed of identical component parts for each counting stage, input signals of the setting stages of the auxiliary storage unit are combined in separate circuits.

If the setting stages have, for example, three inputs each, signals can be formed as follows:

$\vartheta_{2/0} = \bar{r}_1 \& t_2 \& \bar{l} \& z_1 \& A_0$
$\vartheta_{5/3} = \bar{r}_1 \& t_2 \& \bar{l} \& z_1 \& A_0 \& A_1 \& A_2 \& A_3$
$\vartheta_{8/6} = \vartheta_{5/3} \& A_4 \& A_5 \& A_6$
$\vartheta_{11/9} = \vartheta_{5/3} \& A_4 \& A_5 \& A_6 \& A_7 \& A_8 \& A_9$
$\qquad \cdot$
$\qquad \cdot$
$\qquad \cdot$
$\eta_{2/0} = r_1 \& t_2 \& \bar{l} \& z_1 \& \overline{A}_0$
$\eta_{5/3} = r_1 \& t_2 \& \bar{l} \& z_1 \& \overline{A}_0 \& \overline{A}_1 \& \overline{A}_2 \& \overline{A}_3$
$\eta_{8/6} = \eta_{5/3} \& \overline{A}_4 \& \overline{A}_5 \& \overline{A}_6$
$\eta_{11/9} = \eta_{5/3} \& \overline{A}_4 \& \overline{A}_5 \& \overline{A}_6 \& \overline{A}_7 \& \overline{A}_8 \& \overline{A}_9$ When using these signals $\vartheta$, $\eta$, the following switching functions result for the auxiliary storage units of the counting stages:

$H_0 = (\vartheta_{2/0} \& A_0) \vee (\eta_{2/0} \& \overline{A}_0) \vee (H_0 \& e_u)$
$H_1 = (\vartheta_{2/0} \& A_1) \vee (\eta_{2/0} \& \overline{A}_1) \vee (H_1 \& e_u)$
$H_2 = (\vartheta_{2/0} \& A_1 \& A_2) \vee (\eta_{2/0} \& \overline{A}_1 \& \overline{A}_2) \vee (H_2 \& e_u)$
$H_3 = (\vartheta_{5/3} \& A_3) \vee (\eta_{5/3} \& \overline{A}_3) \vee (H_3 \& e_u)$
$H_4 = (\vartheta_{5/3} \& A_4) \vee (\eta_{5/3} \& \overline{A}_4) \vee (H_4 \& e_u)$
$H_5 = (\vartheta_{5/3} \& A_4 \& A_5) \vee (\eta_{5/3} \& \overline{A}_4 \& \overline{A}_5) \vee (H_5 \& e_u)$
$H_6 = (\vartheta_{8/6} \& A_6) \vee (\eta_{8/6} \& \overline{A}_6) \vee (H_6 \& e_u)$
$\qquad \cdot$
$\qquad \cdot$
$\qquad \cdot$ FIGURE 39a shows the circuit for a counter component for forward-reverse counters. Both setting stages of the auxiliary storage unit $S_H$ in this counter have three inputs, respectively. In FIGURE 39b, there is illustrated a symbol for this counter component. The signals $e_u$, $f$, $r_2 \& t_1 \& \bar{l}$, $\bar{r}_2 \& t_1 \& \bar{l}$, $r_2 \& \bar{l}$, $\bar{r}_2 \& \bar{l}$, $\bar{t}_1 \& \bar{l}$, which are effective upon all counting stages of the counter, are shown applied to a line for the sake of simplicity. They are not connected with one another and pass on to different inputs to the counting stages, as can be seen from FIGURE 39a.

The circuit of the counting stage of FIGURE 39a, and the symbol pertaining thereto according to FIGURE 39b are, respectively, provided with inputs $C_1$ to $C_6$ which have different signals applied to them when they are connected to form counters. In the binary counter, only inputs $C_1$ to $C_4$ are used.

Figure 40A:
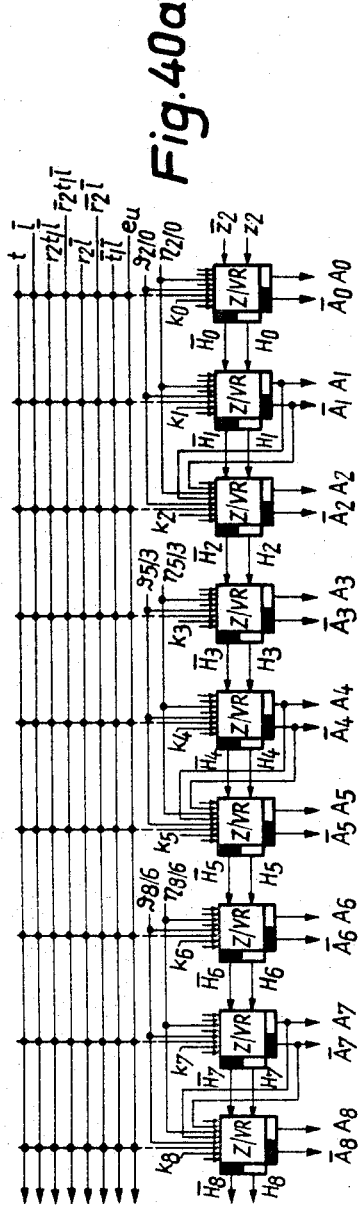
FIGURE 40a is a block diagram of a binary counter constructed of the components shown in FIGURES 39.

FIGURE 40a shows the connection of the first nine counting stages of a binary counter having the components $Z/VR$ of FIGURE 39. As identical components $Z/VR$ are employed for all counting stages, a number of component inputs C have no circuits connected thereto. The circuit arrangements for producing the signals $\vartheta$ used in this counter are shown in FIGURE 40b, and the circuit arrangements for producing the signals $\eta$ are shown in FIGURE 40c.

Figure 41:
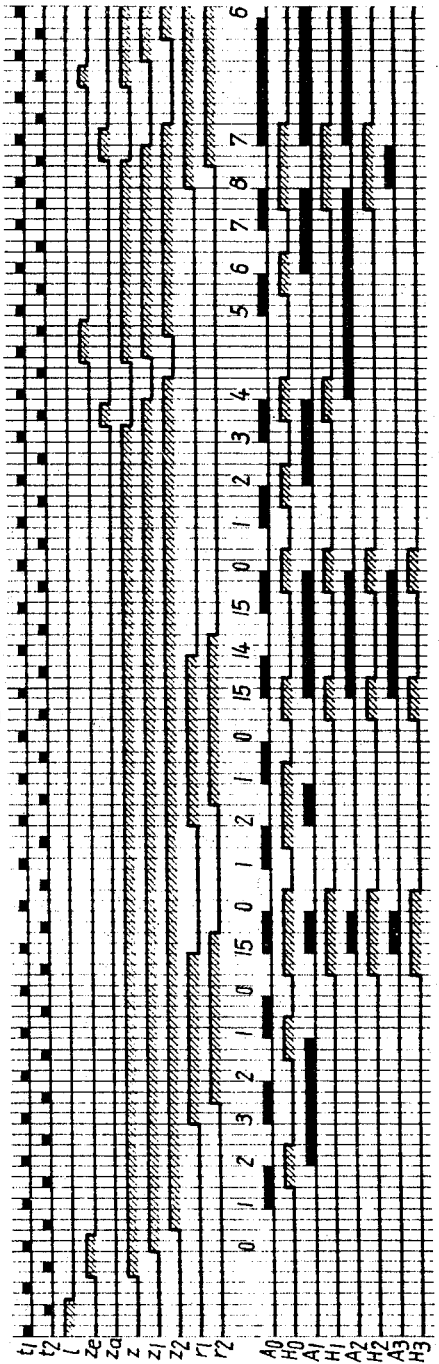
FIGURE 41 is a time plot of a binary counter constructed in accordance with FIGURES 36 and 40 and wherein presetting is not performed.

FIGURE 41 is a signal diagram for a four-stage binary forward/reverse counter constructed in accordance with FIGURES 36 and 40 and wherein presetting is not performed. Upon the occurrence of the clearing signal $1=L$, all of the main and auxiliary storage units of the counter are cleared. In the signal diagram, it is first assumed that the counting direction signal $r=0$, and thus the release signals for reversing the counting direction are $r_1=0$ and $r_2=0$. At the first counting signal $t_1$, after the counting release signal $z_2=L$, the counter thus counts to 1 and with the following counting signal it counts to 2, and so forth. In the signal diagram the signals $r_1$, $r_2$ switch over from 0 to L when the counter content is 3. This means that the counter is to count backward. With the counting signals occurring thereafter, the counter counts to 2, 1, etc. After reaching 0, the counter assumes the highest counter content, in the example, 15. In the diagram, a switching over of the signals $r_1$, $r_2$ to 0 takes place when the counter content is 15, so that again a forward counting operation is carried out, i.e., from 15 the counter sets itself to 0 and then continues counting to 1, and so forth. Further switching over operations are also shown. The counting operation takes place only when $z_2=L$. When $z_2=0$, the counter content reached is maintained. In the right-hand portion of the diagram, two counting interruptions are illustrated.

As can be seen from the signal diagram, each auxiliary signal H is produced such that, during the forward counting operation, it corresponds to 0 at the beginning of a signal A of the same counting stage and corresponds to L at the end of this signal A. During the reverse counting operation, however, it corresponds to L at the beginning of this signal A assigned thereto, and at the end it corresponds to 0.

Figure 42:
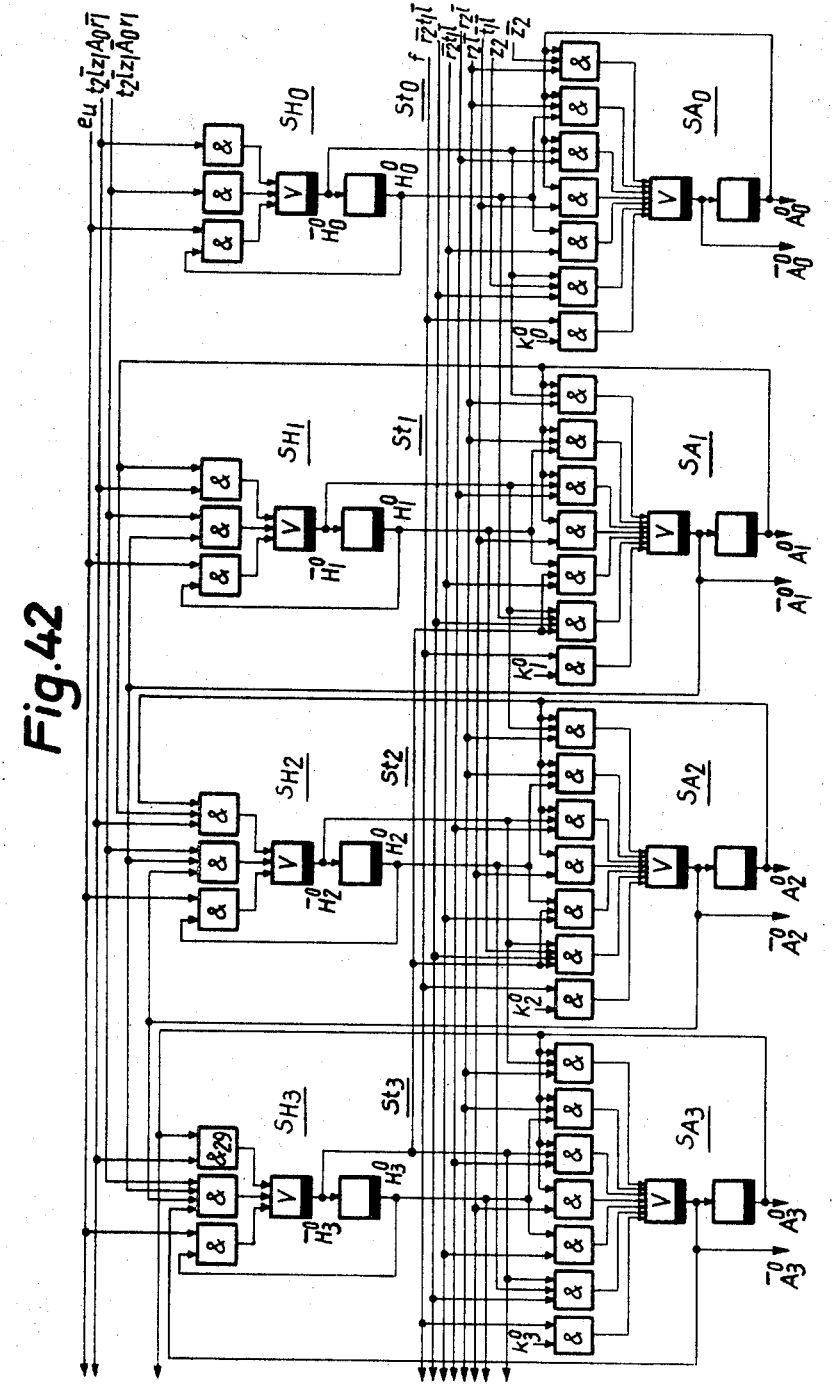
FIGURE 42 is a circuit diagram of a counter similar to that of FIGURE 36 but arranged as a decimal counter.

The binary counters can be converted to decimal counters in a simple manner. Each counting decade then has four counting stages. FIGURE 42, for example, shows the lowest decade of a decimal counter. In contradistinction to the binary counter of FIGURE 36, the signal $\overline{H}_3$ of the auxiliary storage units $S_{H3}$ of the counting stage with the highest order within a decade is fed back to the main storage units $S_{A1}$ and $S_{A2}$ of the two counting stages $St_1$, $St_2$. Furthermore, in contradistinction to the binary counter, the signals $A_1$, $A_2$ of the main storage units $S_{A1}$, $S_{A2}$, are not applied to the auxiliary storage unit $S_{H3}$. This provides that in a decade during forward counting there appears a 0 when the counting signal following the counter content 9 appears, and that, during reverse counting, there appears a 9 when the counting signal following the counter content 0 appears.

Figure 43A:
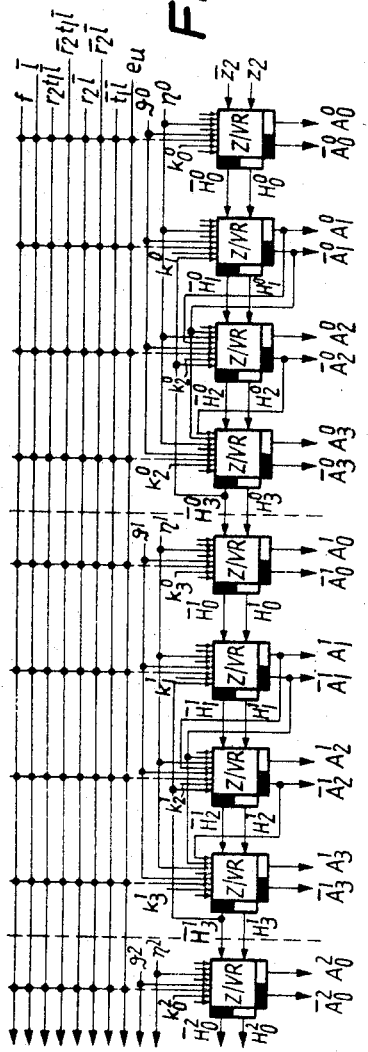
FIGURE 43a is a block diagram of a decade counter constructed of the components shown in FIGURES 39.

Again, the decimal counter can be composed of identical components by combining input signals in separate circuits. FIGURE 43a shows the two lowest decades and a counting stage of the following decade. For this purpose, counter components Z/VR according to FIGURE 39 are employed. Several of the component inputs C are not provided with circuits. The additional circuits for producing the signal $\vartheta$, $\eta$, are not illustrated in FIGURES 43b and 43c, respectively.

Figure 44:
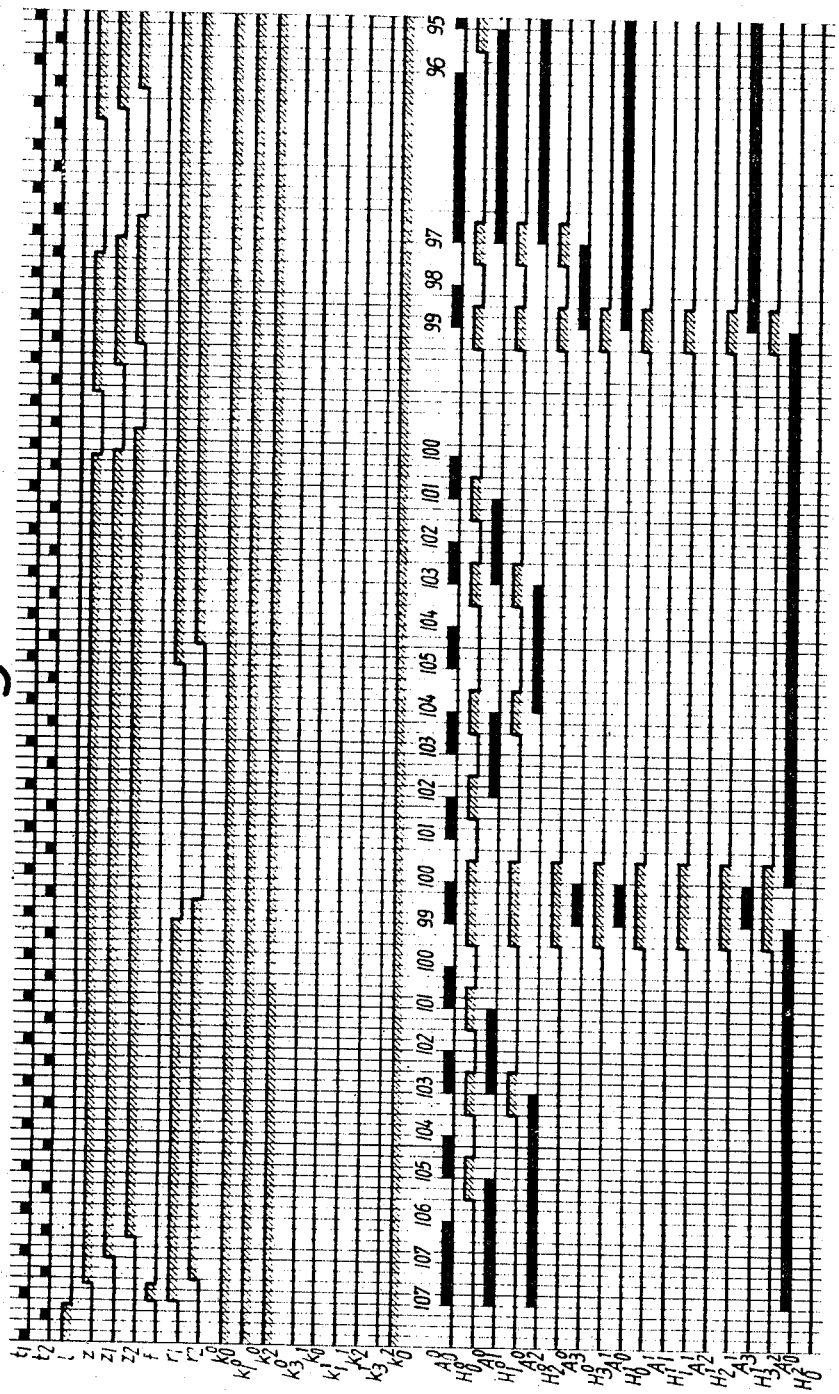
FIGURE 44 is a time plot of a decade counter constructed in accordance with FIGURES 42 and 43 and wherein presetting is performed.

FIGURE 44 is a signal diagram for a decade forward/reverse counter wherein presetting is performed. The diagram shows the setting of the starting digit 107. After $z_2=L$, reverse counting is started from 107 because $r_1=L$ and $r_2=L$. During the time the counter content is 99, a switching over of the signals $r_1$, $r_2$ to 0 takes place, so that thereafter the counting signals $t_1$ are counted in the forward direction. During the counter content 105, a further switching over to reverse counting occurs. The diagram further shows two counting interruptions.

For producing the reversible binary forward/reverse counter according to FIGURE 36, the counters of FIGURES 33 and 34 are employed. In the counter of FIGURE 33, a forward counting operation takes place at the A outputs. Each auxiliary signal H is produced in such manner that it corresponds to 0 at the beginning of the signal A assigned thereto, and that it corresponds to L at the end of this signal A. In the counter of FIGURE 34, a reverse counting operation takes place at the A outputs. Each auxiliary signal H is produced in such manner that it corresponds to L at the beginning of the signal A assigned thereto, and that it corresponds to 0 at the end of this signal A.

FIGURE 45 shows a counter similar to that of FIGURE 34 wherein reverse counting takes place at the A outputs. However, each auxiliary signal is produced as in the counter of FIGURE 33 such that it is 0 at the beginning of the signal A and is L at the end of signal A.

Figure 46:
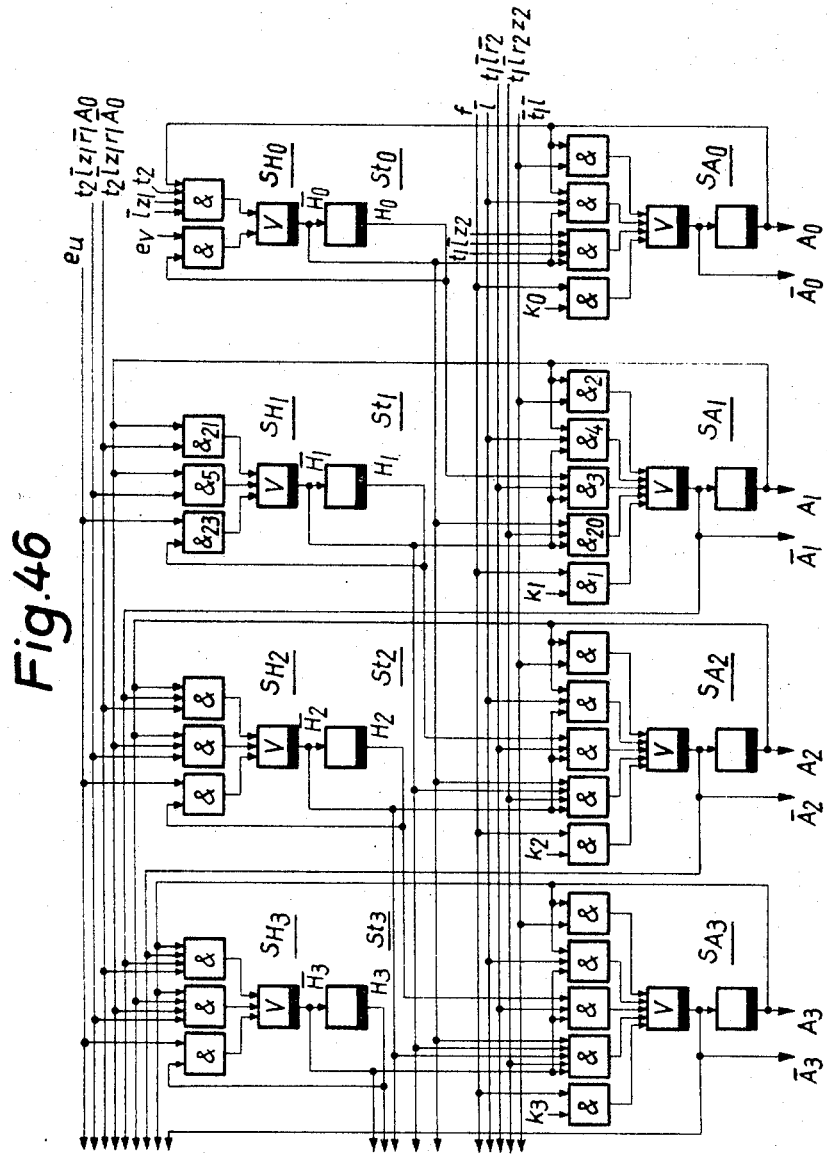
FIGURE 46 is a circuit diagram of a binary forward/reverse counter which combines the features of the counters of FIGURES 33 and 45.

FIGURE 46 is a reversible binary forward/reverse counter which is a hybrid of the counters of FIGURES 33 and 45 and has provision for the introduction of a switching over signal, as has already been explained for the counter of FIGURE 36. Since the counting stages with the lowest order of the counters of FIGURES 33 and 45, respectively, are identical, such a counting stage forms the counting stage with the lowest order of the forward/reverse counter of FIGURE 46. In the counting stage $St_1$ of the counter according to FIGURE 46, the AND-stages $\&_1$, $\&_2$, $\&_4$ correspond to the identically designated AND-stages of FIGURES 33 and 45. The AND-stages $\&_3$, $\&_5$ of the counter of FIGURE 33 have been incorporated in the counter of FIGURE 46, with the addition of a negated switch-over signal $\bar{r}$. The AND-stages $\&_{20}$, $\&_{21}$ of the counter of FIGURE 45 have been incorporated with the addition of the switch-over signal $r$. The AND-stage $\&_{23}$ of the counter of FIGURE 46 is a combination of the AND-stage $\&_6$ of the counter of FIGURE 33 and the AND-stage $\&_{22}$ of the counter of FIGURE 45.

The further counting stages $St_2$, $St_3$ of the counter of FIGURE 46 are constructed in the same manner as the counting stage $St_1$. In the following, the switching functions of the forward/reverse counter of FIGURE 46 are set forth:

$A_0=(t_1\&\bar{l}\&z_2\&\overline{H}_0)v(A_0\&\overline{H}_0\&\bar{l})v(A_0\&\bar{t}_1\&\bar{l})v(k_0\&f)$ $H_0=(t_2\&\bar{l}\&z_1\&A_0)v(H_0\&A_0\&\bar{l})v(H_0\&\bar{t}_2\&\bar{l})$ with $\overline{e_v}=(A_0\&\bar{l})v(\bar{t}_2\&\bar{l})$ or $\bar{e}_v=lv(\overline{A}_0\&t_2)$ for $n=1, 2, 3, \ldots$ $A_n=(\bar{r}_2\&t_1\&\bar{l}\&H_{n-1}\&\overline{H}_n)v(r_2\&t_1\&\bar{l}\&z_2\&\overline{H}_0\&\overline{H}_1 \ldots \overline{H}_n)$
$\qquad v(A_n\&\overline{H}_n\&\bar{l})v(A_n\&\bar{t}_1\&\bar{l})v(k_n\&f)$ $H_n=(\bar{r}_1\&t_2\&\bar{l}\&z_1\&A_0\&A_1 \ldots A_n)v(r_1\&t_2\&\bar{l}\&z_1\&\overline{A}_0\&\overline{A}_1$
$\qquad \ldots \overline{A}_{n-1}\&A_n)v(H_n\&e_u\&\bar{l})$ with $e_u=(\bar{t}_2\&\bar{l})v(\bar{r}_1\&A_0\&\bar{l})v(r_1\&\overline{A}_0\&\bar{l})$ or $\bar{e}_u=lv(\bar{r}_1\&t_2\&\overline{A}_0)v(r_1\&t_2\&A_0)$ The signal $e_v$ is formed as in the counter of FIGURE 33, and the signal $e_u$ is produced as in the counter of FIGURE 36.

If it is desired that the counter of FIGURE 46 be composed of identical components, input signals of the setting stages with increasing input number can be combined in separate circuits, as has been mentioned in connection with the counter of FIGURE 40.

Figure 47:
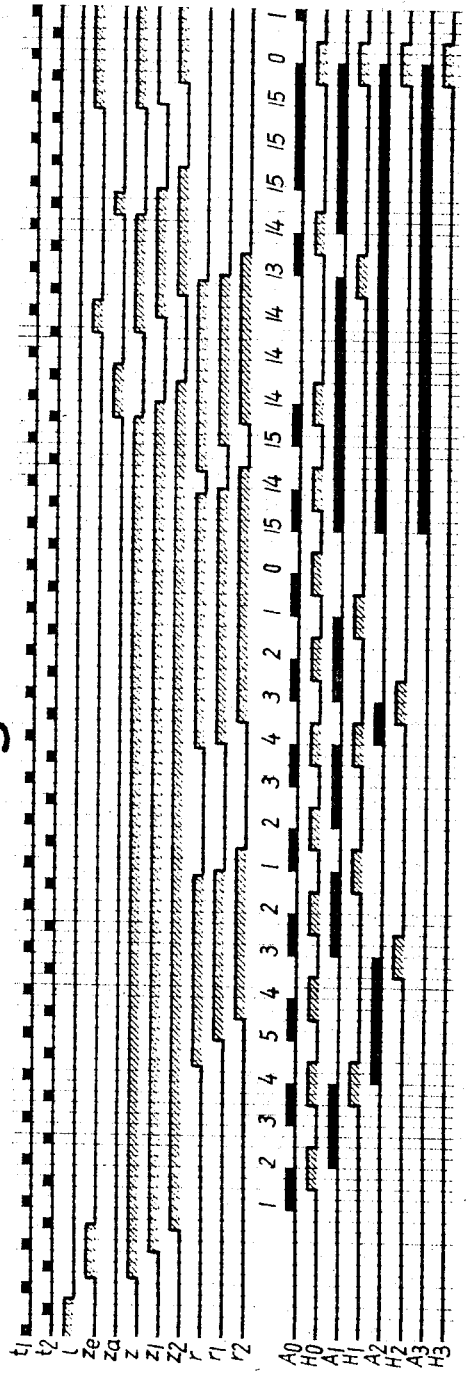
FIGURE 47 is a time plot of the signals of the counter of FIGURE 46 and wherein presetting is not performed.

FIGURE 47 is a signal diagram for the forward/reverse counter of FIGURE 46, wherein presetting is not performed. As with the counters of FIGURES 36 and 40, a forward counting operation takes place when $r_1$, $r_2$ correspond to 0, and a reverse counting operation is carried out when $r_1$, $r_2$ are L. During the time $z_2=0$, the counting operation is interrupted. It can be seen from the signal diagram that, independent of whether the counter counts forward or backward, the H signal of the same counting stage is 0 at the beginning of each A signal, and is L at the end of the A signal.

A decimal counter can be made from the binary counter of FIGURE 46 in a simple manner. Four respective counting stages then again form a counting decade. FIGURE 48 shows an embodiment for the lowest decade of such a counter. For purposes of conversion, a few setting conditions are altered as set forth below. Setting stages with a negated release signal for switching over the counting direction $\bar{r}_1$, $\bar{r}_2$ are called forward setting stages, and setting stages with a YES or positive release signal for reversing the counting direction $r_1$, $r_2$ are called reverse setting stages. In the decimal counter, in each counting decade: (a) the negated output signal $\overline{H}_3$ of the auxiliary storage unit $S_{H3}$ of the counting stage of the highest order is applied back to the forward setting stage of the main storage unit $S_{A1}$ with the second lowest order; (b) the YES output signal $H_3$ of the auxiliary storage unit $S_{H3}$ of the counting stage of the highest order is fed back to the reverse setting stage of the main storage unit $S_{A2}$ with the next-lower order; (c) a signal formed in accordance with the switching function $g = H_2 \vee H_3$ from the signals of the auxiliary storage units $S_{H2}$ and $S_{H3}$ of the two counting stages with the highest orders is applied to the reverse setting stage of the main storage unit $S_{A1}$ of the counting stage with the second-lowest order; and furthermore (d) in the forward setting stage of the auxiliary storage unit $S_{H3}$ of the highest order, the input signals $A_1$, $A_2$ from the main storage units $S_{A1}$, $S_{A2}$ of the two counting stages with the next-lower orders have been omitted. Also, the input signals $\overline{H}$ of the reverse setting stages of the two main storage units $S_{A1}$, $S_{A2}$ can, but need not be, omitted.

Figure 49:
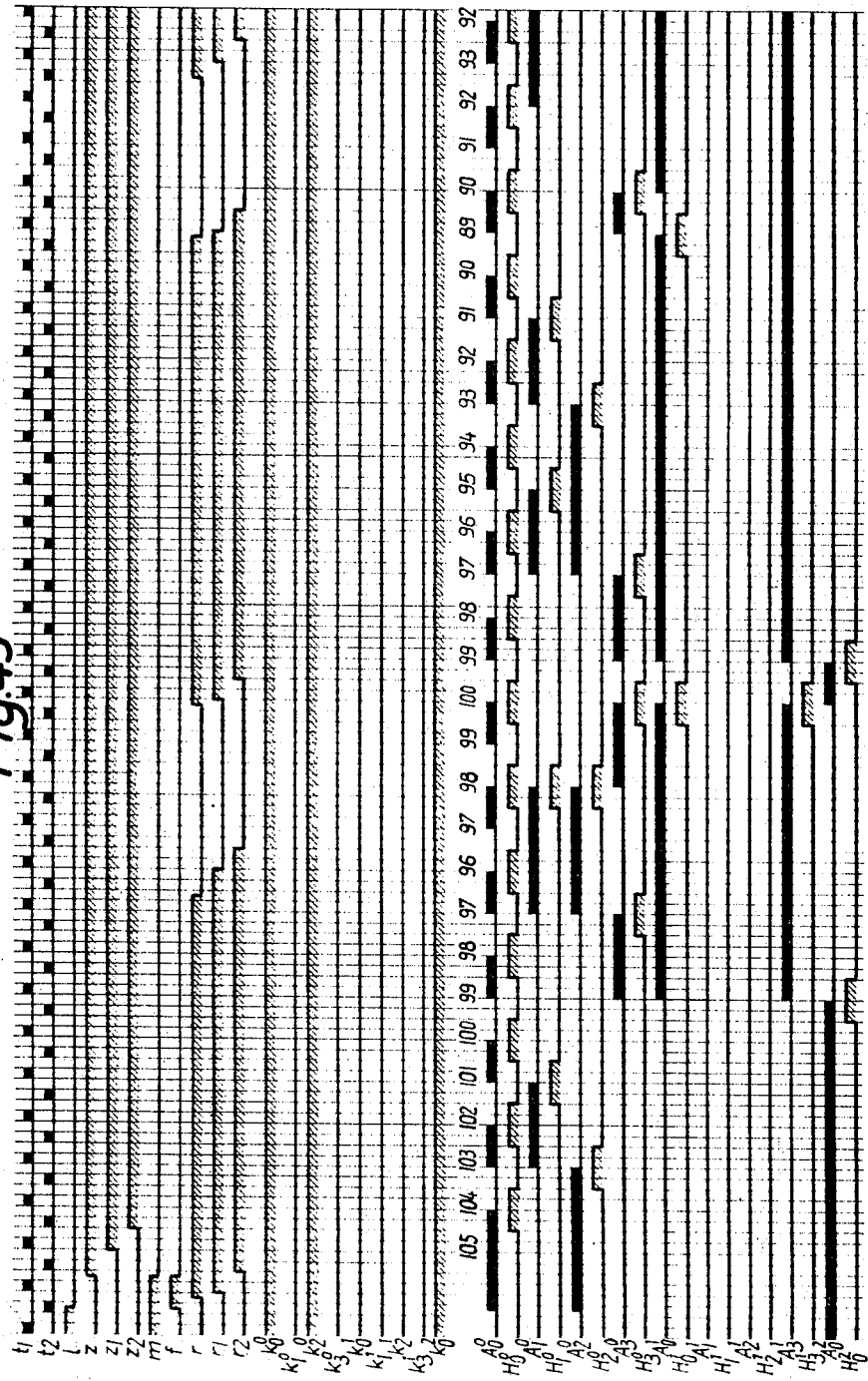
FIGURE 49 is a time plot of the signals of the counter of FIGURE 48 and wherein presetting is performed.

FIGURE 49 is a signal diagram for a decimal forward/reverse counter such as is shown in FIGURE 48 and wherein presetting is performed. After the presetting of 105, at first a reverse counting operation is illustrated. At the counter content 96, a switch-over to forward counting occurs and at the counter content 100 there is again a switch-over to reverse counting, and so forth.

It will be understood that the above description of the present invention is susceptible to various modifications, changes, and adaptations, and the same are intended to be comprehended within the meaning and range of equivalents of the appended claims.

What is claimed is:

1. A counter for forward and reverse binary and decimal counting with selective presetting of a starting number, comprising, in combination:
   a plurality of stages, each stage having
   a main storage unit,
   an auxiliary storage unit,
   means for applying counting signals to the main storage unit for controlling it,
   means for applying auxiliary counting signals, which change their conditions at different times than the counting signals, to the auxiliary storage unit for controlling it; and
   means connecting said main and auxiliary storage units with each other so that the changes in the counter stages caused by the counting signals and the auxiliary counting signals take place, respectively, within the storage time for one storage unit.

2. A counter as defined in claim 1 wherein the connecting means is arranged so that the main storage units of the counting stages are controlled only by means of output signals of the auxiliary storage units and the auxiliary storage units are controlled only by means of output signals of the main storage units.

3. A counter as defined in claim 2 wherein said connecting means is arranged so that in each counting stage, each auxiliary storage unit is controlled by the main storage unit to which it is assigned and by main storage units of preceding counting stages, and each main storage unit is controlled by the auxiliary storage unit assigned to it and by auxiliary storage units of preceding counting stages.

4. A counter as defined in claim 3 wherein each four adjacent counting stages are arranged in decades for decimal counting, and said connecting means is arranged to apply, in each decade of four counting stages, a signal from the counting stage of the highest order of the decade back to the counting stage with the second-lowest order.

5. A counter as defined in claim 2 wherein said connecting means is arranged so that the main storage units are connected with one another and a signal of a lower counting stage is applied to these main storage units.

6. A counter as defined in claim 2 wherein the connecting means is arranged so that the auxiliary storage units are connected with one another, and a signal of a lower counting stage is applied to these auxiliary storage units.

7. A counter for forward and reverse binary and decimal counting with selective presetting of a starting number, comprising, in combination:
   a plurality of stages, each stage having
   a main storage unit,
   an auxiliary storage unit,
   means for applying counting signals to the main storage unit for controlling it,
   means for applying auxiliary counting signals, which change their conditions at different times than the counting signals, to the auxiliary storage unit for controlling it;
   means for applying other control signals to said counting stages; and
   means connecting said main and auxiliary storage units with each other so that the changes in the counter stages caused by the counting signals and the auxiliary counting signals take place, respectively, within the storage time for one storage unit.

8. A counter as defined in claim 7 comprising means connected to said control signal applying means for combining in separate logic circuits the signals controlling the counting stages to limit the number of inputs to the counting stages, the output of such circuits being connected to the counting stages.

9. A counter as defined in claim 8 wherein said connecting means are arranged so that the storage units of one type are connected with one another and a signal of a lower counting stage is applied to these units of one type.

10. A counter as defined in claim 7 wherein the main storage units have outputs $A$ and negated outputs $\overline{A}$, the auxiliary storage units have outputs $H$ and negated outputs $\overline{H}$ and the following control signals can be applied: counting signals $t_1$, auxiliary counting signals $t_2$, clearing signal $1$, counting release signal $z$, presetting signals $k$, presetting release signal $f$, as well as such signals which are negated.

11. A counter as defined in claim 10 wherein the main storage units are connected to have the following logical functions:

$A_0 = (t_1 \& \bar{l} \& z_2 \& \overline{H}_0) \vee (A_0 \& \overline{H}_0 \& \bar{l}) \vee (A_0 \& \bar{t}_1 \& \bar{l}) \vee (k_0 \& f)$
$A_1 = (t_1 \& \bar{l} \& H_0 \& \overline{H}_1) \vee (A_1 \& \overline{H}_1 \& \bar{l}) \vee (A_1 \& \bar{t}_1 \& \bar{l}) \vee (k_1 \& f)$
$A_2 = (t_1 \& \bar{l} \& H_1 \& \overline{H}_2) \vee (A_2 \& \overline{H}_2 \& \bar{l}) \vee (A_2 \& \bar{t}_1 \& \bar{l}) \vee (k_2 \& f)$
$A_3 = (t_1 \& \bar{l} \& H_2 \& \overline{H}_3) \vee (A_3 \& \overline{H}_3 \& \bar{l}) \vee (A_3 \& \bar{t}_1 \& \bar{l}) \vee (k_3 \& f).$ 12. A counter as defined in claim 10 wherein the auxiliary storage units are connected to have the following logical functions:

$H_0 = (t_2 \& \bar{l} \& z_1 \& A_0) \vee (H_0 \& \bar{t}_2 \& \bar{l}) \vee (H_0 \& A_0 \& \bar{l})$
$H_1 = (t_2 \& \bar{l} \& z_1 \& A_0 \& A_1) \vee (H_1 \& \bar{t}_2 \& \bar{l}) \vee (H_1 \& A_1 \& \bar{l})$
$H_2 = (t_2 \& \bar{l} \& z_1 \& A_0 \& A_1 \& A_2) \vee (H_2 \& \bar{t}_2 \& \bar{l}) \vee (H_2 \& A_2 \& \bar{l})$
$H_3 = (t_2 \& \bar{l} \& z_1 \& A_0 \& A_1 \& A_2 \& A_3) \vee (H_3 \& \bar{t}_2 \& \bar{l}) \vee (H_3 \& A_3 \& \bar{l}).$ 13. A counter as defined in claim 11 wherein the auxiliary storage units are connected to have the following logical functions:

$H_0 = (t_2 \& \bar{l} \& z_1 \& A_0) \vee (H_0 \& \bar{t}_2 \& \bar{l}) \vee (H_0 \& A_0 \& \bar{l})$
$H_1 = (t_2 \& \bar{l} \& z_1 \& A_0 \& A_1) \vee (H_1 \& \bar{t}_2 \& \bar{l}) \vee (H_1 \& A_1 \& \bar{l})$
$H_2 = (t_2 \bar{l} \& z_1 \& A_0 \& A_1 \& A_2) \vee (H_2 \& \bar{t}_2 \& \bar{l}) \vee (H_2 \& A_2 \& \bar{l})$
$H_3 = (t_2 \& \bar{l} \& z_1 \& A_0 \& A_1 \& A_2 \& A_3) \vee (H_3 \& \bar{t}_2 \& \bar{l}) \vee (H_3 \& A_3 \& \bar{l})$ 14. A counter as defined in claim 10 wherein the auxiliary storage units are connected to have the following logical functions:

$H_0 = (t_2 \& \bar{l} \& z_1 \& A_0) \vee (H_0 \& e)$
$H_1 = (t_2 \& \bar{l} \& z_1 \& A_0 \& A_1) \vee (H_1 \& e)$
$H_2 = (t_2 \& \bar{l} \& z_1 \& A_0 \& A_1 \& A_2) \vee (H_2 \& e)$
$H_3 = (t_2 \& \bar{l} \& z_1 \& A_0 \& A_1 \& A_2 \& A_3) \vee (H_3 \& e)$ wherein $e = (\bar{t}_2 \& \bar{l}) \vee (A_0 \& \bar{l})$ or $e = H_0$.

15. A counter as defined in claim 14 wherein the main storage units are connected to have the following logical functions:

$$A_0 = \overline{(t_1 \& H_0) \vee l \vee A_0 \vee (t_1 \& z_2 \& \overline{H}_0) \vee (k_0 \& f)}$$

$$A_1 = \overline{(t_1 \& H_1) \vee l \vee A_1 \vee (t_1 \& H_0 \& \overline{H}_1) \vee (k_1 \& f)}$$

$$A_2 = \overline{(t_1 \& H_2) \vee l \vee A_2 \vee (t_1 \& H_1 \& \overline{H}_2) \vee (k_2 \& f)}$$

$$A_3 = \overline{(t_1 \& H_3) \vee l \vee A_3 \vee (t_1 \& H_2 \& \overline{H}_3) \vee (k_3 \& f)}$$

16. A counter as defined in claim 4 wherein the auxiliary storage units are connected so that in each decade the negated output signal ($\overline{H}_3$) of the auxiliary storage unit with the highest order within the decade is applied to a setting stage ($\&_1$) of the main storage unit with the second lowest order of the same decade and a setting stage of the auxiliary storage units has the following logical functions:

$$H_0^0: t_2 \& \overline{l} \& z_1 \& A_0^0$$
$$H_1^0: t_2 \& \overline{l} \& z_1 \& A_0^0 \& A_1^0$$
$$H_2^0: t_2 \& \overline{l} \& z_1 \& A_0^0 \& A_1^0 \& A_2^0$$
$$H_3^0: t_2 \& \overline{l} \& z_1 \& A_0^0 \& A_3^0$$
$$H_0^1: t_2 \& \overline{l} \& z_1 \& A_0^0 \& A_3^0 \& A_0^1$$
$$H_1^1: t_2 \& \overline{l} \& z_1 \& A_0^0 \& A_3^0 \& A_0^1 \& A_1^1$$
$$H_2^1: t_2 \& \overline{l} \& z_1 \& A_0^0 \& A_3^0 \& A_0^1 \& A_1^1 \& A_2^1$$
$$H_3^1: t_2 \& \overline{l} \& z_1 \& A_0^0 \& A_3^0 \& A_0^1 \& A_3^1$$

17. A counter as defined in claim 10 wherein the main and auxiliary storage units are connected to have the following logical functions:

$$A_0 = \overline{(t_1 \& H_0) \vee A_0 \vee (t_1 \& \overline{H}_0)}$$

$$A_1 = \overline{(t_1 \& H_0 \& H_1) \vee A_1 \vee (t_1 \& H_0 \& \overline{H}_1)}$$

$$A_2 = \overline{(t_1 \& H_0 \& H_1 \& H_2) \vee A_2 \vee (t_1 \& H_0 \& H_1 \& \overline{H}_2)}$$

$$A_3 = \overline{(t_1 \& H_0 \& H_1 \& H_2 \& H_3) \vee A_3 \vee (t_1 \& H_0 \& H_1 \& H_2 \& \overline{H}_3)}$$
$$H_0 = (t_2 \& A_0) \vee (H_0 \& \overline{t}_2) \vee (H_0 \& A_0)$$
$$H_1 = (t_2 \& A_1) \vee (H_1 \& \overline{t}_2) \vee (H_1 \& A_1)$$
$$H_2 = (t_2 \& A_2) \vee (H_2 \& \overline{t}_2) \vee (H_2 \& A_2)$$
$$H_3 = (t_2 \& A_3) \vee (H_3 \& \overline{t}_2) \vee (H_3 \& A_3)$$

18. A counter as defined in claim 17 connected for decimal counting and wherein the logical functions for the $A_1$ and $A_3$ storage units are modified as follows:

$$A_1 = \overline{(t_1 \& H_0 \& H_1) \vee A_1 \vee (t_1 \& H_0 \& \overline{H}_1 \& \overline{H}_3)}$$

$$A_3 = \overline{(t_1 \& H_0 \& H_3) \vee A_3 \vee (t_1 \& H_0 \& H_1 \& H_2 \& \overline{H}_3)}$$

19. A counter as defined in claim 10 wherein the counting stages are connected with one another in such manner that the auxiliary storage unit of each counting stage is controlled by the negated output signals ($\overline{A}$) of the main storage units of all counting stages having a lower order and each main storage unit is connected to be controlled by the negative signal ($\overline{H}$) of the counting stage having the next lower order so that the result of reverse counting appears at the YES outputs (A) of the main storage units.

20. A counter as defined in claim 19 wherein each main storage unit is connected to be controlled by the negated output signals ($\overline{H}$) of the auxiliary storage units of all counting stages have a lower order.

21. A counter as defined in claim 19 wherein the counter is connected for binary counting and has the following logical functions:

$$A_0 = (t_1 \& \overline{l} \& \overline{H}_0) \vee (A_0 \& H_0 \& \overline{l}) \vee (A_0 \& \overline{z}_2 \& \overline{l})$$
$$\vee (A_0 \& \overline{t}_1 \& \overline{l}) \vee (k_0 \& f)$$
$$H_0 = (t_2 \& \overline{l} \& z_1 \& \overline{A}_0) \vee (H_0 \& e_r)$$

for $n = 1, 2, 3, \ldots$ $$A_n = (t_1 \& \overline{l} \& \overline{H}_n) \vee (A_n \& H_n \& \overline{l}) \vee (A_n \& \overline{H}_{n-1} \& \overline{l})$$
$$\vee (A_n \& \overline{t}_1 \& \overline{l}) \vee (k_n \& f)$$

$$H_n = (t_2 \& \overline{l} \& z_1 \& \overline{A}_0 \& \overline{A}_1 \& \ldots \overline{A}_n) \vee (H_n \& e_r)$$

with $e_r = (\overline{A}_0 \& \overline{l}) \vee (\overline{t}_2 \& \overline{l})$, where $e_r$ is a signal which is formed from a combination of other control signals for simplification.

22. A counter as defined in claim 20 wherein the counter is connected for binary counting and has the following logical functions:

$$A_0 = (t_1 \& \overline{l} \& \overline{H}_0) \vee (A_0 \& H_0 \& \overline{l}) \vee (A_0 \& \overline{z}_2 \& \overline{l})$$
$$\vee (A_0 \& \overline{t}_1 \& \overline{l}) \vee (k_0 \& f)$$
$$H_0 = (t_2 \& \overline{l} \& z_1 \& \overline{A}_0) \vee (H_0 \& e_r)$$

for $n = 1, 2, 3, \ldots$ $$A_n = (t_1 \& \overline{l} \& \overline{H}_n) \vee (A_n \& H_n \& \overline{l}) \vee (A_n \& \overline{H}_{n-1} \& \overline{l})$$
$$\vee (A_n \& \overline{t}_1 \& \overline{l}) \vee (k_n \& f)$$

$$H_n = (t_2 \& \overline{l} \& z_1 \& \overline{A}_0 \& \overline{A}_1 \& \ldots \overline{A}_n) \vee (H_n \& e_r)$$

with $e_r = (\overline{A}_0 \& \overline{l}) \vee (\overline{t}_2 \& \overline{l})$.

23. A counter as defined in claim 21 wherein four adjacent counting stages form a decade for decimal counting and the stages within a decade are connected so that one signal from the auxiliary storage unit of the counting stage with the highest order with the counting decade is fed back to the main storage units of the two counting stages having the next lower orders.

24. A counter as defined in claim 22, four adjacent counting stages form a decade for decimal counting and the stages within a decade are connected so that one signal from the auxiliary storage unit of the counting stage having the highest order within the counting decade is fed back to the main storage units of the two counting stages having the next lower orders, and a signal from the auxiliary storage unit of the counting stage having the second highest order within the counting decade is fed back to the main storage unit of the counting stage having the next lower order.

25. A counter as defined in claim 19 comprising separate circuits in which input signals are combined and connected so that their output signals control the counting stages to provide for a unitary construction of the counting stages.

26. A counter as defined in claim 1 comprising, for the selective forward/reverse counting at the A-outputs of the main storage units, means for applying a switching-over signal ($\overline{r}$) at all previous main and auxiliary storage units of the counting stages for initiating the forward counting operation, the main and auxiliary storage units having additional input stages at which the counter order switching-over signal ($r$) is effective for initiating the reverse counting operation, each main storage unit being connected to be controlled by the output signals of the auxiliary storage units of the counting stage having the next lower order, and each auxiliary storage unit being controlled by the output signals of all counting stages having lower orders.

27. A counter as defined in claim 26 wherein each main storage unit is connected to be controlled by the output signals of the auxiliary storage units of all counting stages of lower order.

28. A counter as defined in claim 26 wherein the counting stage of the lowest order corresponds to that of a forward counter.

29. A counter as defined in claim 26 wherein the YES outputs of the auxiliary storage units are connected to produce signals (H) in such a manner that, in the case of a forward counting operation, they correspond to 0 at the beginning of the YES output signal (A) of the main storage units, which YES output signal is assigned to these YES output signals (H), and correspond to L at the end of this signal (A), and that the YES output signals (H) in the case of a reverse counting operation, correspond to L at the beginning of the YES output signal (A) pertaining thereto of the main storage units, and correspond to 0 at the end of this signal (A).

30. A counter as defined in claim 27 wherein said connecting means is arranged so that in the case of both counting directions, the YES output signals (H) of the auxiliary storage units are produced such that they correspond to 0 at the beginning of the YES output signal (A) pertaining thereto of the main storage units, and correspond to L at the end of this signal (A).

31. A counter as defined in claim 29 wherein for binary counting, the following logical functions are provided:

$$A_0 = (\bar{r}_2 \& t_1 \& \bar{l} \& z_2 \& \bar{H}_0) \vee (r_2 \& t_1 \& \bar{l} \& H_0) \vee (A_0 \& \bar{t}_1 \& \bar{l})$$
$$\vee (A_0 \& \bar{r}_2 \& \bar{l} \& \bar{H}_0) \vee (A_0 \& r_2 \& \bar{l} \& H_0) \vee (A_0 \& r_2 \& \bar{l} \& \bar{z}_2) \vee (k_0 \& f)$$

$$H_0 = (\bar{r}_1 \& t_2 \& \bar{l} \& z_1 \& A_0) \vee (r_1 \& t_2 \& \bar{l} \& z_1 \& \bar{A}_0) \vee (H_0 \& e_u)$$

for $n = 1, 2, 3, \ldots$ $$A_n = (\bar{r}_2 \& t_1 \& \bar{l} \& H_{n-1} \& \bar{H}_n) \vee (r_2 \& t_1 \& \bar{l} \& H_n)$$
$$\vee (A_n \& \bar{t}_1 \& \bar{l}) \vee (A_n \& \bar{r}_2 \& \bar{l} \& \bar{H}_n) \vee (A_n \& r_2 \& \bar{l} \& H_n)$$
$$\vee (A_n \& r_2 \& \bar{l} \& \bar{H}_{n-1}) \vee (k_n \& f)$$

$$H_n = (\bar{r}_1 \& t_2 \& \bar{l} \& z_1 \& A_0 \& A_1 \& \ldots A_n)$$
$$\vee (r_1 \& t_2 \& \bar{l} \& z_1 \& \bar{A}_0 \& \bar{A}_1 \& \ldots \bar{A}) \vee (H_n \& e_u)$$

with $e_u = (\bar{t}_2 \& \bar{l}) \vee (\bar{r}_1 \& A_0 \& \bar{l}) \vee (r_1 \& \bar{A}_0 \& \bar{l})$ or $$\bar{e}_u = l \vee (\bar{r}_1 \& t_2 \& \bar{A}_0) \vee (r_1 \& t_2 \& A_0),$$

wherein A is the output signals of the main storage units and H is the output signals of the auxiliary storage units, and $e_u$ is a signal by means of which a simplification in the construction of the counter is achieved.

32. A counter as defined in claim 27 wherein for binary counting, the following logical functions are provided:

$$A_0 = (t_1 \& \bar{l} \& z_2 \& \bar{H}_0) \vee (A_0 \& \bar{H}_0 \& \bar{l}) \vee (A_0 \& \bar{t}_1 \& \bar{l}) \vee (k_0 \& f)$$

$$H_0 = (t_2 \& \bar{l} \& z_1 \& A_0) \vee (H_0 \& A_0 \& \bar{l}) \vee (H_0 \& \bar{t}_2 \& \bar{l})$$

for $n = 1, 2, 3, \ldots$ $$A_n = (\bar{r}_2 \& t_1 \& \bar{l} \& H_{n-1} \& \bar{H}_n) \vee (r_2 \& t_1 \& \bar{l} \& z_2 \& \bar{H}_0 \& \bar{H}_1 \ldots \bar{H}_n)$$
$$\vee (A_n \& \bar{H}_n \& \bar{l}) \vee (A_n \& \bar{t}_1 \& \bar{l}) \vee (k_n \& f)$$

$$H_n = (\bar{r}_1 \& t_2 \& \bar{l} \& z_1 \& A_0 \& A_1 \ldots A_n)$$
$$\vee (r_1 \& t_2 \& \bar{l} \& z_1 \& \bar{A}_0 \& \bar{A}_1 \ldots \bar{A}_{n-1} \& A_n) \vee (H_n \& e_u \& \bar{l})$$

with $e_v = (A_0 \& \bar{l}) \vee (\bar{t}_2 \& \bar{l})$ and
$e_u = (\bar{t}_2 \& \bar{l}) \vee (\bar{r}_1 \& A_0 \& \bar{l}) \vee (r_1 \& \bar{A}_0 \& \bar{l})$ 33. A counter as defined in claim 26 wherein counting decades of four counting stages each are provided and arranged so that the negated output signal ($\bar{H}_3$) of the auxiliary storage unit ($S_{H3}$) of the counting stage with the highest order within a decade is always fed back to the main storage units ($S_{A1}$, $S_{A2}$) of the two counting stages ($St_1$, $St_2$) with the next lower orders, and that, to an input stage ($\&_{29}$) of the auxiliary storage unit ($S_{H3}$) with the highest order, only output signals ($A_0$, $A_3$) of the main storage units ($S_{A0}$, $S_{A3}$) of the counting stages with the lowest and the highest order are applied.

34. A counter as defined in claim 27 wherein counting decades of four counting stages each are provided and arranged so that the negated output signal ($\bar{H}_3$) of the auxiliary storage unit ($S_{H3}$) of the counting stage ($St_3$) of the highest order within the decade is always fed back to the forward setting stage ($\&_{30}$) of the main storage unit ($S_{A1}$) with the second lowest order, the YES output signal ($H_3$) of the auxiliary storage unit ($S_{H3}$) of the counting stage ($St_3$) with the highest order is fed back to the reverse setting stage ($\&_{31}$) of the main storage unit ($S_{A2}$) with the next lower order, a signal formed in accordance with the switching function $g = H_2 \vee H_3$ from the signals of the auxiliary storage units ($S_{H2}$, $S_{H3}$) of the two counting stages ($St_2$, $St_3$) with the highest orders is applied to the reverse setting stage ($\&_{32}$) of the main storage unit ($S_{A1}$) of the counting stage ($St_1$) with the second lowest order, and, to a forward setting stage ($\&_{33}$) of the auxiliary storage unit ($S_{H3}$) of the highest order only output signals ($A_0$, $A_3$) from the main storage units ($S_{A0}$, $S_{A3}$) of the two counting stages ($St_0$, $St_3$) with the lowest and highest order, are applied.

35. A counter as defined in claim 26 comprising separate circuits in which input signals of the counter are combined and having output signals connected to control the counting stages for permitting unitary construction of the counting stages.

36. A counter as defined in claim 20 wherein the counter is connected for binary counting and has the following logical functions:

$$A_0 = (t_1 \& \bar{l} \& z_2 \& \bar{H}_0) \vee (A_0 \& \bar{H}_0 \& \bar{l}) \vee (A_0 \& \bar{t}_1 \& \bar{l}) \vee (k_0 \& f)$$

$$H_0 = (t_2 \& \bar{l} \& z_1 \& A_0) \vee (H_0 \& e)$$

for $n = 1, 2, 3, \ldots$ $$A_n = (t_1 \& \bar{l} \& z_2 \& \bar{H}_0 \& \bar{H}_1 \& \bar{H}_2 \& \ldots \bar{H}_n)$$
$$\vee (A_n \& \bar{H}_n \& \bar{l}) \vee (k_n \& f)$$

$$H_n = (t_2 \& \bar{l} \& z_1 \& A_0 \& A_1 \& A_2 \& \ldots \bar{A}_{n-1} \& A_n) \vee (H_n \& e_r)$$

with $e = (A_0 \& \bar{l}) \vee (\bar{t}_2 \& \bar{l})$ and $e_r = (\bar{A}_0 \& \bar{l}) \vee (\bar{t}_2 \& \bar{l})$.

References Cited

UNITED STATES PATENTS 3,114,883   12/1963   Arthur _____ 235—92 X
3,310,660   3/1967   Cogar _____ 235—92

MAYNARD R. WILBUR, *Primary Examiner.*

GREGORY J. MAIER, *Assistant Examiner.*

U.S. Cl. X.R.

328—48